US012811838B2

(12) United States Patent
Hof et al.

(10) Patent No.: US 12,811,838 B2
(45) Date of Patent: Nov. 24, 2026

(54) EFFICIENT SPECTRAL-SHAPING CREST FACTOR REDUCTION

(71) Applicant: QUALCOMM Incorporated, San Diego, CA (US)

(72) Inventors: Eran Hof, Haifa (IL); Ariel Yaakov Sagi, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 238 days.

(21) Appl. No.: 18/742,734

(22) Filed: Jun. 13, 2024

(65) Prior Publication Data

US 2025/0385823 A1 Dec. 18, 2025

(51) Int. Cl.
*H04L 27/26* (2006.01)
*H04L 25/03* (2006.01)

(52) U.S. Cl.
CPC ...... *H04L 27/2623* (2013.01); *H04L 25/0384* (2013.01); *H04L 27/2646* (2013.01)

(58) Field of Classification Search
None
See application file for complete search history.

(56) References Cited

U.S. PATENT DOCUMENTS 9,924,523 B2 * 3/2018 Lee ........................ H04W 72/20
2015/0043444 A1 * 2/2015 Wei ........................ H04B 7/0413 370/329
2017/0064615 A1 * 3/2017 Im ........................ H04B 15/00

* cited by examiner

*Primary Examiner* — Anh Ngoc M Nguyen
(74) *Attorney, Agent, or Firm* — QUALCOMM Incorporated

(57) ABSTRACT

Methods, systems, and devices for wireless communication are described. Various aspects generally relate to crest factor reduction (CFR) techniques that provide a more efficient spectral shaping. Some aspects more specifically relate to a pre-programming of cancellation signals in memory and a selecting of a pre-programmed cancellation signal for application to a transmit signal. For example, a wireless communication device may generate cancellation signals and store the cancellation signals in memory. The wireless communication device may generate the cancellation signals based on one or more transmission configurations, one or more threshold spectrum interference levels, one or more threshold distortion levels, or any combination thereof. The wireless communication device may select a cancellation signal from memory based on detecting a peak associated with a power level of a transmit signal. The wireless communication device may perform a wireless transmission based on applying the cancellation signal to the transmit signal.

20 Claims, 14 Drawing Sheets

EFFICIENT SPECTRAL-SHAPING CREST FACTOR REDUCTION

FIELD OF TECHNOLOGY

The following relates to wireless communication, including efficient spectral-shaping crest factor reduction (CFR).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some systems, two or more devices may communicate via wireless signaling. Such devices may support various wireless communication techniques or technologies. For example, two or more wireless communication devices may support orthogonal frequency division multiplexing (OFDM). In some cases, OFDM signals may have relatively large peak-to-average power ratios (PAPRs), which may adversely impact wireless communications.

SUMMARY

The systems, methods, and devices of this disclosure each have several innovative aspects, no single one of which is solely responsible for the desirable attributes disclosed herein.

A method for wireless communication by a wireless communication device is described. The method may include obtaining a transmit signal, detecting one or more peaks associated with a power level of the transmit signal, selecting, from one or more memories associated with the wireless communication device, one or more cancellation signals based on the one or more peaks associated with the power level of the transmit signal, and performing a wireless transmission in association with applying the one or more cancellation signals to the transmit signal.

A wireless communication device for wireless communication is described. The wireless communication device may include one or more memories storing processor executable code, and one or more processors coupled with the one or more memories. The one or more processors may individually or collectively be operable to execute the code to cause the wireless communication device to obtain a transmit signal, detect one or more peaks associated with a power level of the transmit signal, select, from one or more memories associated with the wireless communication device, one or more cancellation signals based on the one or more peaks associated with the power level of the transmit signal, and perform a wireless transmission in association with applying the one or more cancellation signals to the transmit signal.

Another wireless communication device for wireless communication is described. The wireless communication device may include means for obtaining a transmit signal, means for detecting one or more peaks associated with a power level of the transmit signal, means for selecting, from one or more memories associated with the wireless communication device, one or more cancellation signals based on the one or more peaks associated with the power level of the transmit signal, and means for performing a wireless transmission in association with applying the one or more cancellation signals to the transmit signal.

A non-transitory computer-readable medium storing code for wireless communication is described. The code may include instructions executable by one or more processors to obtain a transmit signal, detect one or more peaks associated with a power level of the transmit signal, select, from one or more memories associated with the wireless communication device, one or more cancellation signals based on the one or more peaks associated with the power level of the transmit signal, and perform a wireless transmission in association with applying the one or more cancellation signals to the transmit signal.

Some examples of the method, wireless communication devices, and non-transitory computer-readable medium described herein may further include operations, features, means, or instructions for delaying the transmit signal to obtain a delayed transmit signal and applying the one or more cancellation signals to the delayed transmit signal, where performing the wireless transmission may be in association with applying the one or more cancellation signals to the delayed transmit signal.

Some examples of the method, wireless communication devices, and non-transitory computer-readable medium described herein may further include operations, features, means, or instructions for truncating the delayed transmit signal to obtain a portion of the delayed transmit signal, where applying the one or more cancellation signals to the delayed transmit signal includes applying the one or more cancellation signals to the portion of the delayed transmit signal.

Some examples of the method, wireless communication devices, and non-transitory computer-readable medium described herein may further include operations, features, means, or instructions for scaling the one or more cancellation signals based on one or more magnitudes of the one or more peaks to obtain a scaled one or more cancellation signals and applying the scaled one or more cancellation signals to the transmit signal, where performing the wireless transmission may be in association with applying the scaled one or more cancellation signals to the transmit signal.

Some examples of the method, wireless communication devices, and non-transitory computer-readable medium described herein may further include operations, features, means, or instructions for rotating the one or more cancellation signals based on one or more angles of the one or more peaks to obtain a rotated one or more cancellation signals and applying the rotated one or more cancellation signals to the transmit signal, where performing the wireless transmission may be in association with applying the rotated one or more cancellation signals to the transmit signal.

Some examples of the method, wireless communication devices, and non-transitory computer-readable medium described herein may further include operations, features, means, or instructions for obtaining a second transmit signal in association with applying the one or more cancellation signals to the transmit signal and applying a clipper to the second transmit signal, where a magnitude of the clipper may be based on the one or more cancellation signals, and where performing the wireless transmission may be in association with applying the clipper to the second transmit signal.

In some examples of the method, wireless communication devices, and non-transitory computer-readable medium described herein, the transmit signal may be a wideband transmit signal associated with a set of multiple narrowband transmit signals and the one or more cancellation signals may be associated with a set of multiple narrowband cancellation signals that correspond to the set of multiple narrowband transmit signals, each narrowband cancellation signal of the set of multiple narrowband cancellation signals corresponding to a respective narrowband transmit signal of the set of multiple narrowband transmit signals.

Some examples of the method, wireless communication devices, and non-transitory computer-readable medium described herein may further include operations, features, means, or instructions for combining the set of multiple narrowband cancellation signals to obtain a wideband cancellation signal and applying the wideband cancellation signal to the wideband transmit signal, where performing the wireless transmission may be in association with applying the wideband cancellation signal to the wideband transmit signal.

In some examples of the method, wireless communication devices, and non-transitory computer-readable medium described herein, the wideband cancellation signal may be based on a modulated summation of the set of multiple narrowband cancellation signals.

In some examples of the method, wireless communication devices, and non-transitory computer-readable medium described herein, combining the set of multiple narrowband cancellation signals to obtain the wideband cancellation signal may include operations, features, means, or instructions for applying a respective weight to each narrowband cancellation signal of the set of multiple narrowband cancellation signals to obtain a weighted set of multiple narrowband cancellation signals and combining the weighted set of multiple narrowband cancellation signals to obtain the wideband cancellation signal.

In some examples of the method, wireless communication devices, and non-transitory computer-readable medium described herein, the set of multiple narrowband transmit signals may be associated with a variation in power density levels between different narrowband transmit signals of the set of multiple narrowband transmit signals, the respective weight applied to each narrowband cancellation signal of the set of multiple narrowband cancellation signals may be based on a deviation of gains between the set of multiple narrowband transmit signals to obtain an equal power density level across the wideband transmit signal, and the deviation of gains between the set of multiple narrowband transmit signals may be based on the variation in power density levels between the different narrowband transmit signals of the set of multiple narrowband transmit signals.

Some examples of the method, wireless communication devices, and non-transitory computer-readable medium described herein may further include operations, features, means, or instructions for normalizing the wideband cancellation signal to obtain a normalized wideband cancellation signal and storing the normalized wideband cancellation signal in the one or more memories associated with the wireless communication device, where selecting the one or more cancellation signals includes selecting the normalized wideband cancellation signal, and where applying the wideband cancellation signal to the wideband transmit signal includes applying the normalized wideband cancellation signal to the wideband transmit signal.

Some examples of the method, wireless communication devices, and non-transitory computer-readable medium described herein may further include operations, features, means, or instructions for applying each narrowband cancellation signal of the set of multiple narrowband cancellation signals corresponding to the respective narrowband transmit signal of the set of multiple narrowband transmit signals, where performing the wireless transmission may be in association with applying each narrowband cancellation signal to the respective narrowband transmit signal.

In some examples of the method, wireless communication devices, and non-transitory computer-readable medium described herein, the one or more cancellation signals may be further selected based on a transmission configuration of the wireless communication device, one or more threshold spectrum interference levels, one or more threshold distortion levels, or any combination thereof and the transmission configuration may be based on a component carrier (CC) configuration associated with the transmit signal or a resource block (RB) configuration associated with the transmit signal, or both.

In some examples of the method, wireless communication devices, and non-transitory computer-readable medium described herein, in accordance with selecting the one or more cancellation signals based on the RB configuration associated with the transmit signal, the one or more cancellation signals may be based on one or more modulation schemes associated with the transmit signal, one or more coding rates associated with the transmit signal, or a set of RBs within a CC associated with the transmit signal.

In some examples of the method, wireless communication devices, and non-transitory computer-readable medium described herein, in accordance with selecting the one or more cancellation signals based on the CC configuration associated with the transmit signal, the one or more cancellation signals may be based on one or more gaps between two or more CCs associated with the transmit signal or one or more power density levels of one or more CCs associated with the transmit signal.

A method for wireless communication by a wireless communication device is described. The method may include receiving information indicative of one or more transmission configurations of the wireless communication device, where the one or more transmission configurations are based on one or more CC configurations or one or more RB configurations, or both, generating a set of multiple cancellation signals based on the one or more transmission configurations of the wireless communication device, and storing the set of multiple cancellation signals in one or more memories associated with the wireless communication device.

A wireless communication device for wireless communication is described. The wireless communication device may include one or more memories storing processor executable code, and one or more processors coupled with the one or more memories. The one or more processors may individually or collectively be operable to execute the code to cause the wireless communication device to receive information indicative of one or more transmission configurations of the wireless communication device, where the one or more transmission configurations are based on one or more CC configurations or one or more RB configurations, or both, generate a set of multiple cancellation signals based on the one or more transmission configurations of the wireless communication device, and store the set of multiple cancellation signals in one or more memories associated with the wireless communication device.

Another wireless communication device for wireless communication is described. The wireless communication device may include means for receiving information indicative of one or more transmission configurations of the wireless communication device, where the one or more transmission configurations are based on one or more CC configurations or one or more RB configurations, or both, means for generating a set of multiple cancellation signals based on the one or more transmission configurations of the wireless communication device, and means for storing the set of multiple cancellation signals in one or more memories associated with the wireless communication device.

A non-transitory computer-readable medium storing code for wireless communication is described. The code may include instructions executable by one or more processors to receive information indicative of one or more transmission configurations of the wireless communication device, where the one or more transmission configurations are based on one or more CC configurations or one or more RB configurations, or both, generate a set of multiple cancellation signals based on the one or more transmission configurations of the wireless communication device, and store the set of multiple cancellation signals in one or more memories associated with the wireless communication device.

Some examples of the method, wireless communication devices, and non-transitory computer-readable medium described herein may further include operations, features, means, or instructions for receiving second information indicative of one or more threshold spectrum interference levels or one or more threshold distortion levels, where generating the set of multiple cancellation signals may be further based on the one or more threshold spectrum interference levels or the one or more threshold distortion levels.

In some examples of the method, wireless communication devices, and non-transitory computer-readable medium described herein, the set of multiple cancellation signals includes a set of wideband cancellation signals.

In some examples of the method, wireless communication devices, and non-transitory computer-readable medium described herein, generating the set of wideband cancellation signals may include operations, features, means, or instructions for generating a set of multiple narrowband cancellation signals based on the one or more transmission configurations of the wireless communication device and based on one or more threshold spectrum interference levels or one or more threshold distortion levels and combining the set of multiple narrowband cancellation signals to obtain the set of wideband cancellation signals.

In some examples of the method, wireless communication devices, and non-transitory computer-readable medium described herein, combining the set of multiple narrowband cancellation signals to obtain the set of wideband cancellation signals may include operations, features, means, or instructions for combining a first set of multiple narrowband cancellation signals to obtain a first wideband cancellation signal and combining a second set of multiple narrowband cancellation signals to obtain a second wideband cancellation signal.

In some examples of the method, wireless communication devices, and non-transitory computer-readable medium described herein, the first wideband cancellation signal may be based on a first modulated summation of the first set of multiple narrowband cancellation signals and may be associated with a first transmission configuration of the one or more transmission configurations and the second wideband cancellation signal may be based on a second modulated summation of the second set of multiple narrowband cancellation signals and may be associated with a second transmission configuration of the one or more transmission configurations.

Some examples of the method, wireless communication devices, and non-transitory computer-readable medium described herein may further include operations, features, means, or instructions for applying a first respective weight to each narrowband cancellation signal of the first set of multiple narrowband cancellation signals to obtain a weighted first set of multiple narrowband cancellation signals, where obtaining the first wideband cancellation signal may be based on combining the weighted first set of multiple narrowband cancellation signals and applying a second respective weight to each narrowband cancellation signal of the second set of multiple narrowband cancellation signals to obtain a weighted second set of multiple narrowband cancellation signals, where obtaining the second wideband cancellation signal may be based on combining the weighted second set of multiple narrowband cancellation signals.

In some examples of the method, wireless communication devices, and non-transitory computer-readable medium described herein, the first respective weight applied to each narrowband cancellation signal of the first set of multiple narrowband cancellation signals may be based on a first variation in power density levels between different narrowband transmit signals associated with a first transmit signal and the second respective weight applied to each narrowband cancellation signal of the second set of multiple narrowband cancellation signals may be based on a second variation in power density levels between different narrowband transmit signals associated with a second transmit signal.

Some examples of the method, wireless communication devices, and non-transitory computer-readable medium described herein may further include operations, features, means, or instructions for normalizing the first wideband cancellation signal to obtain a normalized first wideband cancellation signal, where storing the set of multiple cancellation signals includes storing the normalized first wideband cancellation signal and normalizing the second wideband cancellation signal to obtain a normalized second wideband cancellation signal, where storing the set of multiple cancellation signals includes storing the normalized second wideband cancellation signal.

In some examples of the method, wireless communication devices, and non-transitory computer-readable medium described herein, each wideband cancellation signal of the set of wideband cancellation signals may be based on a respective transmission configuration of the one or more transmission configurations of the wireless communication device.

In some examples of the method, wireless communication devices, and non-transitory computer-readable medium described herein, the set of multiple cancellation signals includes a set of narrowband cancellation signals.

In some examples of the method, wireless communication devices, and non-transitory computer-readable medium described herein, each narrowband cancellation signal of the set of narrowband cancellation signals corresponds to a respective CC of a set of CCs, the set of CCs based on the one or more CC configurations.

In some examples of the method, wireless communication devices, and non-transitory computer-readable medium described herein, generating the set of multiple cancellation signals may include operations, features, means, or instructions for generating the set of multiple cancellation signals based on one or more modulation schemes, one or more coding rates, or a set of RBs within a CC in accordance with the one or more RB configurations.

In some examples of the method, wireless communication devices, and non-transitory computer-readable medium described herein, generating the set of multiple cancellation signals may include operations, features, means, or instructions for generating the set of multiple cancellation signals based on one or more gaps between two or more CCs or one or more power density levels of one or more CCs in accordance with the one or more CC configurations.

In some examples of the method, wireless communication devices, and non-transitory computer-readable medium described herein, updating, based on one or more configured parameters or based on feedback associated with one or more wireless transmissions by the wireless communication device, one or more cancellation signals of the set of multiple cancellation signals to obtain an updated one or more cancellation signals and storing the updated one or more cancellation signals in the one or more memories associated with the wireless communication device.

Some examples of the method, wireless communication devices, and non-transitory computer-readable medium described herein may further include operations, features, means, or instructions for performing one or more wireless transmissions in association with applying one or more cancellation signals, from the set of multiple cancellation signals stored in the one or more memories, to one or more transmit signals, where a selection of the one or more cancellation signals, from the set of multiple cancellation signals stored in the one or more memories, may be based on one or more peaks associated with a power level of the one or more transmit signals.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

DETAILED DESCRIPTION

Figure 1:
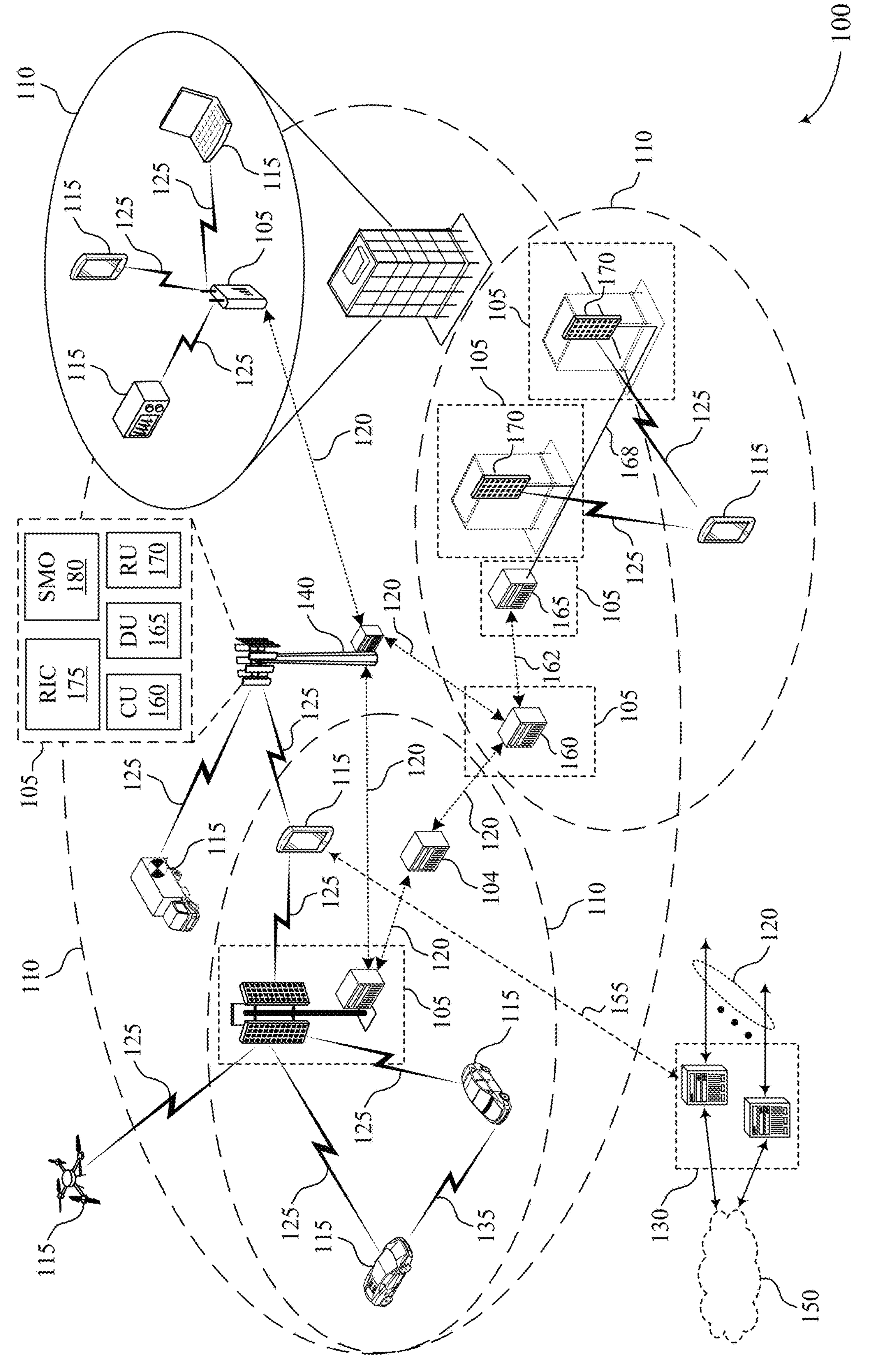
FIG. 1 shows an example of a wireless communications system that supports efficient spectral-shaping crest factor reduction (CFR) in accordance with one or more aspects of the present disclosure.

In some wireless communication networks, two or more devices may communicate via wireless signaling. Such devices, which may be referred to herein as wireless communication devices, may support one or more of various wireless communication techniques or technologies. For example, two or more wireless communication devices may support orthogonal frequency division multiplexing (OFDM). In some cases, OFDM signals may have relatively large peak-to-average power ratios (PAPRs), which may adversely affect wireless communications in some deployment scenarios. For example, a high PAPR in an OFDM network may result in one or both of out-of-band distortion and in-band distortion, with out-of-band distortion leading to adjacent-channel interference and spectral emission mask (SEM) violations and in-band distortion leading to a degraded throughput. Further, some signals (such as 5G or 6G signals) may include (e.g., may be composed of) several narrowband signals aggregated together to form a wideband signal. To mitigate the impact of high PAPRs in such signaling, a wireless communication device may operate a crest factor reduction (CFR) module or component. While some CFR techniques may introduce a distortion due to peaks in the wideband signal, some spectral shaping constraints and error vector magnitude (EVM) constraints may be defined with respect to both the wideband signal and the narrowband signals that make up the wideband signal. Accordingly, some CFR techniques lack the configurability to meet constraints at both the wideband level and the narrowband level.

Further, some CFR schemes may involve clipping and filtering a signal, which may fail to meet some spectral constraints due to limited filter hardware resources in some devices. For example, to meet the spectral and EVM constraints for a wideband signal composed of (e.g., that includes) several narrowband signals (e.g., several narrowband component carriers (CCs), potentially with gap intervals between the narrowband CCs), a wireless communication device may support and operate one or more programmable filters having lengths that may be prohibitively complex for many hardware implementations (e.g., prohibitively complex large delay filters). Further, such CFR schemes may be limited in spectral properties of a resulting distortion due to PAPR control. Thus, some wireless communication devices may benefit from alternative CFR techniques to address a PAPR associated with a transmit signal while maintaining a relatively low processing complexity and a relatively low hardware burden.

Various aspects of the present disclosure generally relate to CFR techniques that provide a more efficient spectral shaping. Some aspects more specifically relate to a pre-programming of a set of cancellation signals in memory and a selecting of one or more pre-programmed cancellation signals for application to a transmit signal. For example, a wireless communication device may generate (e.g., construct, determine, select, or calculate) a set of cancellation signals and store the generated cancellation signals in one or more memories associated with the wireless communication device. In some implementations, the wireless communication device may generate the set of cancellation signals based on one or more transmission configurations associated with the wireless communication device, such as one or more CC configurations or one or more resource block (RB) configurations that the wireless communication device may use for wireless communications. In accordance with generating the cancellation signals based on one or more transmission configurations, the wireless communication device may generate different cancellation signals based on one or more of different modulation schemes, different coding rates, different RB usages, different power density levels across different CCs, or different gaps between CCs, among other examples. Additionally, or alternatively, the wireless communication device may generate the set of cancellation signals based on one or more threshold spectrum interference levels or one or more threshold distortion levels. Such threshold levels may be retrieved from memory (e.g., the threshold levels may be fixed, such as in accordance with a network specification) or may be indicated via over-the-air signaling between two or more wireless communication devices.

In accordance with storing the set of cancellation signals in the one or more memories, the wireless communication device may select (e.g., retrieve or identify) one or more cancellation signals from the one or more memories to reduce or mitigate a PAPR of one or more signals (e.g., transmit signals, such as data signals, reference signals, or control signals, among other examples) that the wireless communication device expects to transmit (e.g., is actively preparing to transmit). For example, the wireless communication device may obtain a transmit signal (e.g., may obtain, such as generate, a data signal for transmission), detect one or more peaks associated with the transmit signal, and select (from memory) one or more cancellation signals based on the detected peak(s). The one or more cancellation signals may include a wideband cancellation signal that is associated with (e.g., generated based on) a set of narrowband cancellation signals. Additionally, or alternatively, the one or more cancellation signals may include one or more narrowband cancellation signals. Further, in some aspects, the wireless communication device may scale and/or rotate the one or more cancellation signals based on a measured peak magnitude and/or angle. The wireless communication may apply the (scaled and/or rotated) cancellation signal(s) to the transmit signal and perform a wireless transmission based on applying the (scaled and/or rotated) cancellation signal(s) to the transmit signal. For example, the wireless communication device may transmit a signal that is associated with (e.g., generated or determined based on) an addition of (or a difference between) the transmit signal and the (scaled and/or rotated) cancellation signal(s). In some implementations, the wireless communication device may delay the transmit signal and apply the (scaled and/or rotated) cancellation signal(s) to the delayed transmit signal.

Particular aspects and examples of the disclosed subject matter may be implemented to realize one or more of the following advantages. In some examples, by operating with cancellation signals stored in memory, the wireless communication device may support mechanisms and components to efficiently apply spectrally-shaped cancellation signals to satisfy various highly non-trivial constraints of a current or active transmission configuration (e.g., a current or active CC configuration). Further, by having knowledge of an RB configuration (e.g., a modulation and a code rate), the wireless communication device may support spectral shaping match to an RB content of a transmit signal. Moreover, by supporting memory banking of arbitrary spectral shaping, the wireless communication device may support online configuration updates over time (e.g., based on feedback, such as acknowledgment (ACK) feedback, negative ACK (NACK) feedback, or historical information). Such online configuration updates may enable the wireless communication device to adapt to various deployment scenarios or operating conditions, further improving performance.

Additionally, in accordance with the described techniques, the wireless communication device may shape a distortion spectrum to support arbitrary EVM constraints for each narrowband channel included within (e.g., composing) a wideband transmit signal, may shape a distortion spectrum to support a tailored transmission mask and adjacent channel leakage ratio (ACLR) constraints, may achieve PAPR control for a wideband transmit signal including non-equal power density levels under equal/arbitrary EVM and spectral emission mask constraints, or any combination thereof. Further, the described techniques may enable the wireless communication device to generate various narrowband cancellation signals with a freedom of choice and with arbitrary length (as, because cancellation signals are stored in memory, cancellation signal length may be relatively large). With the provided freedom, the wireless communication device may control an amount of distortion provided within a CC, outside of a wideband transmit signal, within gaps between narrowband CCs, or any combination thereof. Such control over the amount of distortion applied to different regions may enable the wireless communication device to satisfy various standard, regulatory, and system constraints while mitigating a PAPR and increasing reliability and throughput.

Aspects of the disclosure are initially described in the context of wireless communications systems. Additionally, aspects of the disclosure are illustrated by and described with reference to a signaling diagram, wideband signals, and a cancellation signal generation procedure. Aspects of the disclosure are further illustrated by and described with reference to apparatus diagrams, system diagrams, and flowcharts that relate to efficient spectral-shaping CFR.

FIG. 1 shows an example of a wireless communications system 100 that supports efficient spectral-shaping CFR in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the “device” may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term “carrier” may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms “transmitting,” “receiving,” or “communicating,” when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

In some examples, such as in a carrier aggregation configuration, a carrier may have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different RAT).

The communication link(s) 125 of the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular RAT (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as OFDM or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 may include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some implementations, a wireless communication device may generate (e.g., program or pre-program) a set of cancellation signals and store the generated cancellation signals in one or more memories associated with the wireless communication device. Such a wireless communication device may be a network entity 105, a UE 115, or any other device capable of transmitting wireless (e.g., over-the-air) signaling. Further, such memory associated with the wireless communication device may include one or more memories at the wireless communication device or one or more memories separate from (but accessible by) the wireless communication device, or any combination thereof. A memory that is separate from and accessible by the wireless communication device may include or refer to a cloud-based storage.

The wireless communication device may generate the set of cancellation signals based on one or more transmission configurations associated with the wireless communication device, such as one or more CC configurations or one or more RB configurations that the wireless communication device may use for wireless communications. Additionally, or alternatively, the wireless communication device may generate the set of cancellation signals based on one or more threshold spectrum interference levels or one or more threshold distortion levels. For example, the wireless communication device may tailor one or more cancellation signals to standard constraints on spectrum and EVM (e.g., standard constraints on an allowed distortion), to regulatory constraints such as spectrum interference levels, and to system/network constraints on allowed (EVM) distortion.

In accordance with storing the set of cancellation signals in the one or more memories, the wireless communication device may select one or more cancellation signals from the one or more memories to reduce or mitigate a PAPR of one or more signals that the wireless communication device expects to transmit. For example, the wireless communication device may obtain a transmit signal (for transmission), detect one or more peaks associated with the transmit signal, and select (from memory) one or more cancellation signals based on the detected peak(s). Thus, in some implementations, the wireless communication device may use a peak detection mechanism instead of a clipping and filtering mechanism. In some aspects, the wireless communication device may scale and/or rotate the one or more cancellation signals based on a measured peak magnitude and/or angle. The wireless communication may apply the (scaled and/or rotated) cancellation signal(s) to the transmit signal and perform a wireless transmission based on applying the (scaled and/or rotated) cancellation signal(s) to the transmit signal.

In some implementations, the wireless communication device may delay the transmit signal and apply the (scaled and/or rotated) cancellation signal(s) to the delayed transmit signal. For example, the wireless communication device may detect a peak event on one point during the transmit signal and apply a cancellation signal (that is read from memory) on a delayed point (after a proper or suitable delay to the transmit signal). Such an application of a cancellation signal to a delayed version of the transmit signal may provide sufficient time for selection of the cancellation signal from memory. In other words, such an application of a cancellation signal to a delayed version of the transmit signal may enable, allow, or facilitate use of cancellation signal(s) read from one or more memories.

Figure 2:
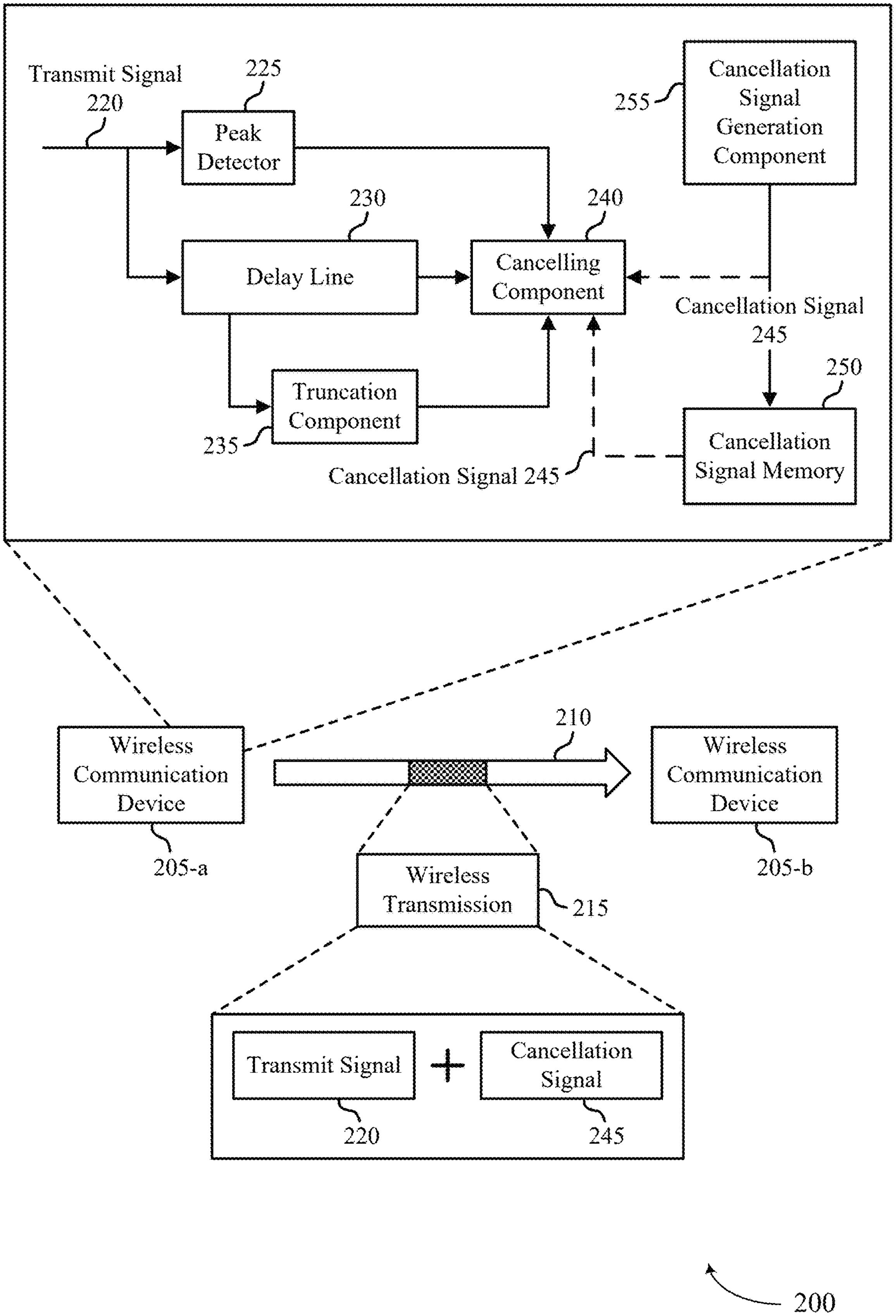
FIG. 2 shows an example of a signaling diagram that supports efficient spectral-shaping CFR in accordance with one or more aspects of the present disclosure.

FIG. 2 shows an example of a signaling diagram 200 that supports efficient spectral-shaping CFR in accordance with one or more aspects of the present disclosure. The signaling diagram 200 illustrates communication between a wireless communication device 205-*a* and a wireless communication device 205-*b* via a communication link 210. The wireless communication device 205-*a* may be an example of a transmitter or transmitting device and the wireless communication device 205-*b* may be an example of a receiver or receiving device. The wireless communication device 205-*a* may implement one or more mechanisms or techniques associated with reducing or mitigating a PAPR associated with a wireless transmission 215.

For example, in some implementations, the wireless communication device 205-*a* may obtain (e.g., generate, such as for transmission) a transmit signal 220 and may provide the transmit signal 220 to a peak detector 225. The wireless communication device 205-*a* may detect one or more peaks associated with a power level of the transmit signal 220 in accordance with providing the transmit signal 220 to the peak detector 225. The wireless communication device 205-*a* may detect a peak by detecting that a portion of the transmit signal 220 is associated with greater than a threshold power level or by detecting that a portion of the transmit signal 220 is associated with greater than a threshold power level difference relative to another portion of the transmit signal 220 (such that a difference between a highest power level of the transmit signal 220 and a lowest power level of the transmit signal 220 is greater than a threshold difference, or such that a difference between a highest power level of the transmit signal 220 and an average power level of the transmit signal 220 is greater than a threshold difference, among other examples).

Additionally, or alternatively, the wireless communication device 205-*a* may detect a peak, using the peak detector 225, by involving (e.g., considering or evaluating) a set of samples before and after the considered processed sample(s) (e.g., before and after the sample(s) of the transmit signal 220 currently being evaluated to detect whether a peak is present). For example, the wireless communication device 205-*a* may detect a peak by comparing a current sample magnitude (or multiple current sample magnitudes) to one or more previous sample magnitudes or one or more future sample magnitudes, or any combination thereof, of the transmit signal 220. In some implementations, the wireless communication device 205-*a* may use the peak detector 225 to detect one or more peaks across a wideband signal (such that, for example, the transmit signal 220 may be a wideband signal). In other words, the wireless communication device

205-*a* may detect one or more peaks on an incoming carrier aggregated (CA) wideband signal.

The wireless communication device 205-*a* may allocate one or more cancelling components 240 (e.g., cancelling processors or signal "adders" or "subtractors") for the detected peak(s). The wireless communication device 205-*a* may allocate the one or more cancelling components 240 in parallel and/or serial (e.g., in series), such as for parallel processing and/or serial processing of one or more detected peaks. In some aspects, the wireless communication device 205-*a* may provide a cancelling component 240 with a delay line 230 output of the incoming signal (e.g., the transmit signal 220) and at least one memory, such as a cancellation signal memory 250 (e.g., cancelling signal memory), from which to read at least one cancellation signal 245. In some examples, the delay line 230 may enable a cancelling component to apply a cancellation signal 245 in accordance with knowledge of both "sides" of a detected peak. Additionally, or alternatively, the delay line 230 may provide sufficient time for the wireless communication device 205-*a* to select one or more cancellation signals 245 from the cancellation signal memory 250 in accordance with detecting one or more peaks on the transmit signal 220.

In some aspects, a length of the delay line 230 may be a variable parameter, such that the wireless communication device 205-*a* may set the length of the delay line 230 to any arbitrary length. The wireless communication device 205-*a* may set and/or update the length of the delay line 230 online or offline. In some examples, the wireless communication device 205-*a* may set or update (e.g., change) the length of the delay line 230 based on (e.g., to meet) a specified constraint (e.g., to meet a spectral emission target or constraint and/or to meet a target distortion, such as a target EVM), to align a sample of a (normalized) cancellation signal 245 with a sample of the transmit signal 220, or any combination thereof. In some implementations, the wireless communication device 205-*a* may discard (e.g., terminate or pause operation or use of) a cancelling component 240. The wireless communication device 205-*a* may discard a cancelling component 240 during a time period absent of signal processing (such as when the wireless communication device 205-*a* is not actively processing a transmit signal 220 for peak detection) or during a time period of active operation of the cancelling component 240 (such as when the wireless communication device 205-*a* is actively processing a transmit signal 220 for peak detection).

Additionally, in some aspects, the wireless communication device 205-*a* may operate a truncation component 235. The wireless communication device 205-*a* may provide an output of the delay line 230 to the truncation component 235, use the truncation component 235 to obtain a portion of the transmit signal 220 (e.g., a portion of the transmit signal 220 including the one or more detected peaks), and provide the portion of the transmit signal 220 to the cancelling component 240. Accordingly, the wireless communication device 205-*a* may apply one or more selected cancellation signals 245 to the portion of the transmit signal 220. In some scenarios, depending on the one or more detected peaks, the wireless communication device 205-*a* may apply a respective set of one or more cancellation signals 245 to each portion of the transmit signal 220 within which at least one peak is detected.

A cancellation signal 245 may be equivalently referred to as a cancelling signal or (pre-programmed) cancellation waveform. In some examples, a cancellation signal 245 that the wireless communication device 205-*a* reads from the cancellation signal memory 250 may be programmable in accordance with (e.g., for or based on) a current CC configuration or a current RB configuration, or both, associated with the transmit signal 220 or the wireless communication device 205-*a*. Additionally, or alternatively, a cancellation signal 245 that the wireless communication device 205-*a* reads from the cancellation signal memory 250 may be programmable in accordance with (e.g., for or based on) one or more threshold spectrum interference levels, one or more threshold distortion levels, or any combination thereof. For example, the wireless communication device 205-*a* may generate one or more cancellation signals 245 using one or more cancellation signal generation components 255 (e.g., cancelling signal generating software) and may store the one or more cancellation signals 245 in the cancellation signal memory 250. The wireless communication device 205-*a* may use the one or more cancellation signal generation components 255 to generate cancellation signals 245 in accordance with one or more CC configurations, one or more RB configurations, one or more threshold spectrum interference levels, one or more threshold distortion levels, or any combination thereof. Such configurations or threshold levels may be based on a standard (e.g., a network specification) constraint or expectation, a regulatory constraint or expectation, or a system constraint or expectation.

As described herein, one or both of a CC configuration or an RB configuration may relate to (e.g., inform or otherwise be associated with) a transmission configuration associated with the transmit signal 220 or the wireless communication device 205-*a*. A CC configuration may be associated with a gap between two or more CCs associated with the transmit signal 220 or one or more power density levels associated with one or more CCs associated with the transmit signal 220. An RB configuration may be associated with a modulation scheme, a code rate, an RB usage, or other information associated with an RB content of the transmit signal 220 (such that a cancellation signal 245 may be generated to support spectral shaping matched to the RB content of the transmit signal 220).

In some aspects, a cancellation signal 245 may be a wideband cancellation signal and may be associated with (e.g., may include or may be based on) one or more narrowband cancellation signals. In such aspects, the wideband cancellation signal may be a combination of two or more narrowband cancellation signals, with the two or more narrowband cancellation signals corresponding to the narrowband transmit signals of a wideband transmit signal. For example, if a wideband transmit signal is associated with (e.g., includes) a first narrowband transmit signal and a second narrowband transmit signal, a first narrowband cancellation signal of the wideband cancellation signal may correspond to the first narrowband transmit signal and a second narrowband cancellation signal of the wideband cancellation signal may correspond to the second narrowband transmit signal. A wideband cancellation signal, which may be denoted by $s_{WB}$, may be generated based on a combination of two or more narrowband cancellation signals, each of which may be denoted by $s_{NB}$, in accordance with Equation 1, shown below. $N_{NB}$ may denote a quantity of the two or more narrowband cancellation signals associated with (included within) the wideband cancellation signal $s_{WB}$.

$$s_{WB}=\Sigma_{n=1}^{N_{NB}}s_{NB}. \tag{1}$$

The combination of the two or more narrowband cancellation signals into the wideband cancellation signal may include or be associated with a weighted summation of the narrowband cancellation signals, a modulated summation of the narrowband cancellation signals, or a weighted and modulated summation of the narrowband cancellation signals. In some implementations, each narrowband cancellation signal $s_{NB}$ samples may be with a freedom of choice in accordance with the narrowband cancellation signals being generated in, for example, software and may be associated with an arbitrary length (e.g., including relatively long lengths) in accordance with the narrowband cancellation signals being stored in the cancellation signal memory 250.

For example, a length of a narrowband cancellation signal, or any other cancellation signal 245 stored in the cancellation signal memory 250, may be limited by (e.g., only limited by) a size of the cancellation signal memory 250. Accordingly, a bandwidth, modulation frequency, and one or more shaping windows associated with a narrowband cancellation signal (or any other cancellation signal 245) may be of arbitrary choice as the wireless communication device 205-*a* may generate (e.g., compute) all samples in software (e.g., via the cancellation signal generation component 255). With the provided freedom of choice associated with a selection of a cancellation signal 245 from the cancellation signal memory 250, the wireless communication device 205-*a* may control (e.g., toggle or change) an amount of distortion provided within one or more CCs, outside of a wideband transmit signal, within gaps between two or more narrowband CCs, or any combination thereof.

The wireless communication device 205-*a* may generate samples associated with a narrowband cancellation signal or any other cancellation signal 245 online or offline. As part of generating a cancellation signal 245 online, the wireless communication device 205-*a* may generate the cancellation signal 245 during active operation, such as while generating or performing wireless transmissions. As part of generating a cancellation signal 245 offline, the wireless communication device 205-*a* may generate the cancellation signal 245 before or after active operation, such as before or after generating or performing wireless transmissions. The wireless communication device 205-*a* may update a cancellation signal 245 based on one or more configured parameters (e.g., during an offline update) or based on feedback, such as hybrid automatic repeat request (HARQ) feedback, associated with one or more wireless transmissions by the wireless communication device 205-*a* (during an online update). In some aspects, the cancellation signal memory 250 may enable or allow for the freedom of updates and changes to one or more cancellation signals 245 in offline or online manners.

The cancellation signal memory 250 may include one or more memories associated with the wireless communication device 205-*a*. One or more memories associated with the wireless communication device 205-*a* may include one or more memories located at the wireless communication device 205-*a* or one or more memories (e.g., a cloud-based storage) located separately from the wireless communication device 205-*a*. In some implementations, by operating with the cancellation signal memory 250 that stores one or more cancellation signals 245, the wireless communication device 205-*a* may support a means or mechanism to efficiently apply cancellation signals 245 (e.g., spectrally-shaped signals) of arbitrary (any) length to satisfy various constraints at the wireless communication device 205-*a*. For example, the wireless communication device 205-*a* may use the cancellation signal memory 250 to efficiently apply relatively long spectrally-shaped signals to satisfy highly non-trivial constraints for one or both of a current CC configuration or a current RB configuration (associated with the transmit signal 220 or the wireless communication device 205-*a*).

Further, in some implementations, the wireless communication device 205-*a* may employ memory banking of arbitrary spectral shaping (e.g., of arbitrarily spectral-shaped cancellations signals 245) to support online configuration updates. In other words, a "bank" of a set of cancellation signals 245 may be programmable and switched online to support (e.g., adapt to) changes in the transmit signal 220. For example, the wireless communication device 205-*a* may initially generate a first set of cancellation signals 245 and, during online operation, may update one or more cancellation signals 245 of the first set of cancellation signals 245. The wireless communication device 205-*a* may store the updated cancellation signals 245 in the memory bank (e.g., in the cancellation signal memory 250).

The wireless communication device 205-*a* may select a cancellation signal 245 from the cancellation signal memory 250 and, in some implementations, may scale or rotate the cancellation signal 245 prior to applying the cancellation signal 245 to the transmit signal 220. In some examples, the wireless communication device 205-*a* may scale or rotate the cancellation signal 245 by, via, or using a cancelling component 240. In some aspects, the wireless communication device 205-*a* may compute one or more rotation factors or one or more scaling factors for a given detected peak using the truncation component 235 (which may be equivalently referred to as a truncation evaluation component). In such aspects, the wireless communication device 205-*a* may compute the rotation factor(s) or the scaling factor(s) (added on the cancellation signal memory 250, or added on at least one cancellation signal 245 from the cancellation signal memory 250) based on a transmit signal interval holding (e.g., including) the peak, among other peak parameters, and may apply (e.g., use) the truncation component 235 in an online manner. Thus, the applied rotation and scale may be evaluated, by the wireless communication device 205-*a*, online based on the truncation component 235.

The wireless communication device 205-*a* may scale or rotate the cancellation signal 245 to provide a suitable (e.g., accurate) cancelling of the allocated (e.g., detected) peaks. The wireless communication device 205-*a* may scale or rotate the cancellation signal 245 based on the measured peak magnitude and angle of the one or more detected peaks. The wireless communication device 205-*a* may apply the (scaled and/or rotated) cancellation signal 245 to the transmit signal 220 by adding the cancellation signal 245 and the transmit signal, by subtracting the cancellation signal 245 from the transmit signal 220, by superimposing the cancellation signal 245 with the transmit signal 220, or by otherwise generating another signal based on the cancellation signal 245 and the transmit signal 220.

In some implementations, the wireless communication device 205-*a* may operate one or more clippers that may be set to a different (e.g., lower) target than the cancelling components 240 (e.g., a different, such as lower, target PAPR). The cancelling components 240 may be followed by the one or more clippers. In such implementations, the wireless communication device 205-*a* may use the one or more clippers that follow the cancelling components 240 to provide additional capability to control an EVM metric and an ACLR. For example, the wireless communication device 205-*a* may obtain a second transmit signal in association with (e.g., based on) applying one or more cancellation signals 245 and may apply a clipper to the second transmit signal. Such a "second transmit signal" may be understood as a version of the transmit signal 220 after application of one or more cancellation signals 245. In some aspects, a magnitude of the clipper may be based on the one or more cancellation signals applied to the transmit signal 220. For example, the wireless communication device 205-*a* may select a parameter of the cancelling and a parameter of the clipping to match each other, which may further improve performance, such as to provide additional capability to control an EVM metric and an ACLR.

In accordance with selecting one or more cancellation signals 245 from the cancellation signal memory 250 and applying the one or more cancellation signals 245 to the transmit signal 220, the wireless communication device 205-*a* may control PAPR for wideband signals including (e.g., composed from or based on) several narrowband channels while enabling spectral shaping to support EVM and spectral constraints. In other words, in accordance with employing or otherwise leveraging memory-programmable spectral-shaping peak-cancelling, the wireless communication device 205-*a* may achieve greater control of spectrum distortion and a PAPR. For example, the wireless communication device 205-*a* may shape the distortion spectrum to support (e.g., achieve, satisfy, or meet) arbitrary EVM constraints for one or more narrowband channels (e.g., for each narrowband channel) of the transmit signal 220 (a wideband signal). Additionally, or alternatively, the wireless communication device 205-*a* may shape the distortion spectrum to support a tailored transmission mask and support (e.g., achieve, satisfy, or meet) one or more ACLR constraints. Additionally, or alternatively, the wireless communication device 205-*a* may achieve PAPR control for wideband transmit signals 220 including (e.g., composed from) non-equal power-density levels under equal/arbitrary EVM and spectral emission mask constraints, among other examples.

Figure 3:
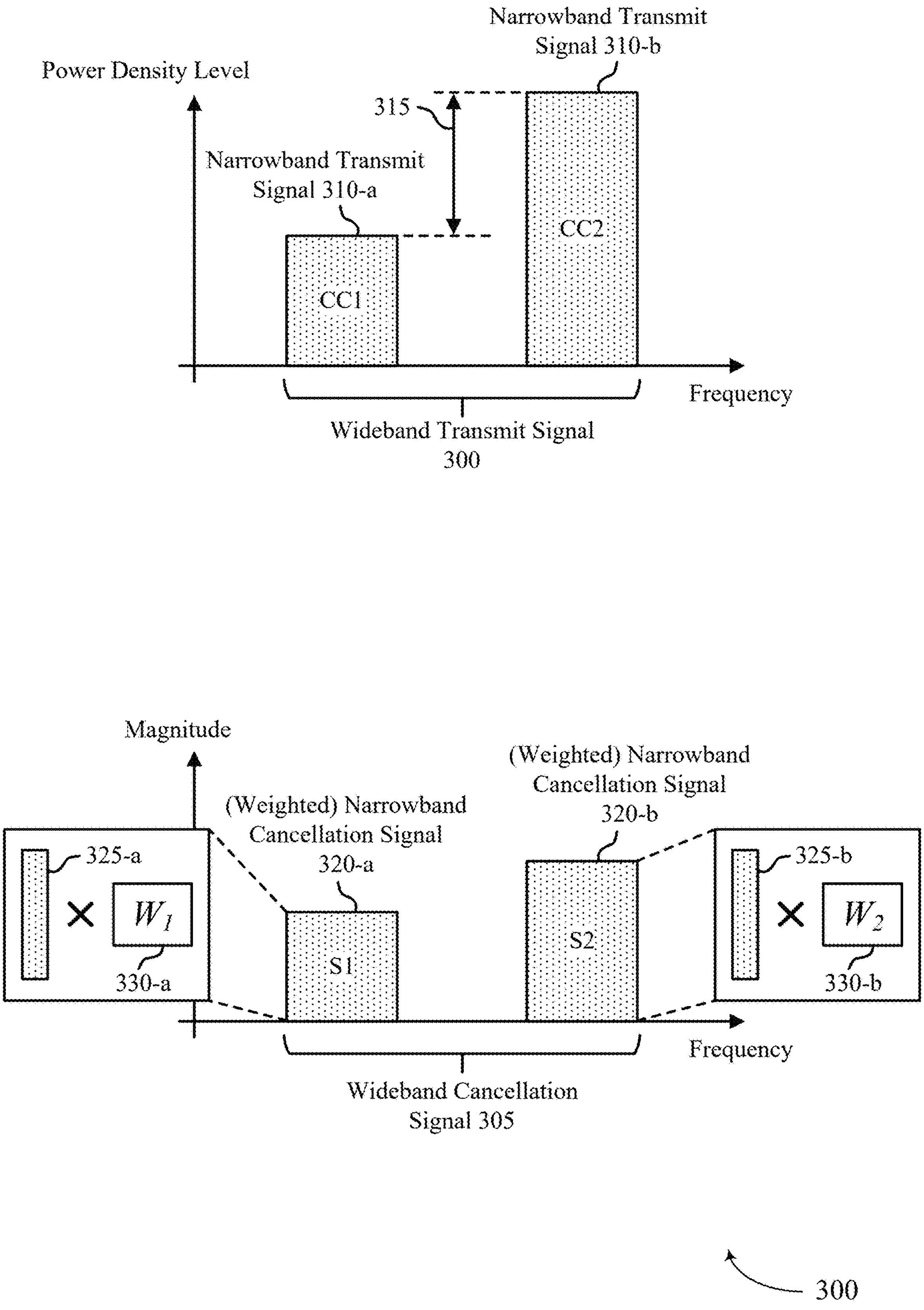
FIG. 3 shows an example of a wideband transmit signal and a wideband cancellation signal that support efficient spectral-shaping CFR in accordance with one or more aspects of the present disclosure.

FIG. 3 shows an example of a wideband transmit signal 300 and a wideband cancellation signal 305 that support efficient spectral-shaping CFR in accordance with one or more aspects of the present disclosure. The wideband cancellation signal 305 may be associated with the wideband transmit signal 300. For example, the wireless communication device 205-*a* (as illustrated by and described with reference to FIG. 2) may apply the wideband cancellation signal 305 to the wideband transmit signal 300 to reduce or mitigate a PAPR associated with the wideband transmit signal 300. The wireless communication device 205-*a* may perform a wireless transmission, such as the wireless transmission 215 as illustrated by and described with reference to FIG. 2, in association with applying the wideband cancellation signal 305 to the wideband transmit signal 300.

The wideband transmit signal 300 may be an example of the transmit signal 220 as illustrated by and described with reference to FIG. 2. In some examples, the wideband transmit signal 300 may be associated with, such as include, a narrowband transmit signal 310-*a* and a narrowband transmit signal 310-*b*. The narrowband transmit signal 310-*a* and the narrowband transmit signal 310-*b* may be associated with different narrowband channels or CCs, which may be contiguous or non-contiguous in frequency. For example, the narrowband transmit signal 310-*a* may be associated with (e.g., located within) a first CC (e.g., CC1) and the narrowband transmit signal 310-*b* may be associated with (e.g., located within) a second CC (e.g., CC2).

The wideband cancellation signal 305 may be an example of the cancellation signal 245 as illustrated by and described with reference to FIG. 2. In some examples, the wideband cancellation signal 305 may be associated with, such as include, a narrowband cancellation signal 320-*a* and a narrowband cancellation signal 320-*b*. The narrowband cancellation signal 320-*a* and the narrowband cancellation signal 320-*b* may be associated with different narrowband channels or CCs, which may be contiguous or non-contiguous in frequency. For example, the narrowband cancellation signal 320-*a* may be associated with (e.g., located within) the first CC (e.g., CC1) and the narrowband cancellation signal 320-*b* may be associated with (e.g., located within) the second CC (e.g., CC2).

In some examples, the wideband cancellation signal 305 may be a combination (e.g., a weighted and/or modulated summation) of the narrowband cancellation signal 320-*a* and the narrowband cancellation signal 320-*b*, with the narrowband cancellation signal 320-*a* and the narrowband cancellation signal 320-*b* corresponding to the narrowband transmit signal 310-*a* and the narrowband transmit signal 310-*b*, respectively. For example, to reduce a PAPR associated with the wideband transmit signal 300 that includes the narrowband transmit signal 310-*a* and the narrowband transmit signal 310-*b*, the wireless communication device 205-*a* may generate or select the wideband cancellation signal 305 associated with the combination of the narrowband cancellation signal 320-*a* and the narrowband cancellation signal 320-*b* in accordance with the narrowband cancellation signal 320-*a* and the narrowband cancellation signal 320-*b* corresponding to the narrowband cancellation signal 320-*a* and the narrowband cancellation signal 320-*b*, respectively.

The wireless communication device 205-*a* may generate or select the wideband cancellation signal 305 such that each narrowband cancellation signal introduces a distortion of a specific power density level within the frequency band (e.g., the bandwidth) of that narrowband cancellation signal. For example, samples of a narrowband cancellation signal may provide a flat distortion within the bandwidth of the narrowband cancellation signal. The bandwidth of the narrowband cancellation signal may be different than the CC bandwidth (e.g., different than a bandwidth of a corresponding narrowband transmit signal). Additionally, or alternatively, the wireless communication device 205-*a* may modulate to a side of the CC bandwidth to satisfy, achieve, or meet one or more spectral emission constraints or to balance between two or more spectral emission constraints.

In some implementations, by generating or selecting the wideband cancellation signal 305 such that each narrowband cancellation signal introduces a distortion of a specific power density level within the frequency band of that narrowband cancellation signal, the wireless communication device 205-*a* may efficiently address or account for various transmission configurations (and standard, regulatory, or system constraints) or operating scenarios associated with (e.g., at) the wireless communication device 205-*a*. Such transmission configurations or operating scenarios may include or be associated with configurations or scenarios in which the wideband transmit signal 300 is associated with a variation 315 in power density levels across the transmitted CCs or channels. In some scenarios, for example, the wideband transmit signal 300 may be associated with a variation 315 in power density levels across the narrowband transmit signal 310-*a* and the narrowband transmit signal 310-*b*. For example, the narrowband transmit signal 310-*a* may be associated with a first power density level and the narrowband transmit signal 310-*b* may be associated with a second power density level. In examples in which the first power density level is different than the second power density level, the wideband transmit signal 300 may be associated with the variation 315.

In such examples in which the narrowband transmit signal 310-*a* and the narrowband transmit signal 310-*b* are associated with the variation 315 in power density levels (e.g., such that the narrowband transmit signal 310-*a* and the narrowband transmit signal 310-*b* have different power density levels), the wireless communication device 205-*a* may apply one or more weights to one or both of the narrowband cancellation signal 320-*a* and the narrowband cancellation signal 320-*b* to generate (e.g., to compose) the wideband cancellation signal 305. In some implementations, the wireless communication device 205-*a* may set the one or more weights according to the level of deviation of gains (e.g., the variation 315) supporting (e.g., to achieve) an equal power density of the wideband transmit signal 300.

For example, to generate the wideband cancellation signal 305, the wireless communication device 205-*a* may initially select or generate a narrowband cancellation signal 325-*a* and a narrowband cancellation signal 325-*b*. The narrowband cancellation signal 325-*a* and the narrowband cancellation signal 325-*b* may correspond to the narrowband transmit signal 310-*a* and the narrowband transmit signal 310-*b*, respectively. The wireless communication device 205-*a* may determine (e.g., select, identify, ascertain, calculate, or otherwise receive information indicative of) a weight 330-*a* and a weight 330-*b* in accordance with the variation 315 in power density levels between the narrowband transmit signal 310-*a* and the narrowband transmit signal 310-*b*. In some aspects, the wireless communication device 205-*a* may determine the weight 330-*a* based on a first gain deviation of the narrowband transmit signal 310-*a* from a nominal gain of the wideband transmit signal 300 and may determine the weight 330-*b* based on a second gain deviation of the narrowband transmit signal 310-*b* from the nominal gain of the wideband transmit signal 300. The weight 330-*a* may be a first weight $W_1$ and the weight 330-*b* may be a second weight $W_2$.

In accordance with determining the weight 330-*a* and the weight 330-*b*, the wireless communication device 205-*a* may apply the weight 330-*a* to the narrowband cancellation signal 325-*a* and may apply the weight 330-*b* to the narrowband cancellation signal 325-*b*. In other words, the wireless communication device 205-*a* may apply a respective weight to each narrowband cancellation signal of a set of narrowband cancellation signals. The wireless communication device 205-*a* may obtain the narrowband cancellation signal 320-*a* (e.g., a first weighted narrowband cancellation signal) in association with applying the weight 330-*a* to the narrowband cancellation signal 325-*a* and may obtain the narrowband cancellation signal 320-*b* (e.g., a second weighted narrowband cancellation signal) in association with applying the weight 330-*b* to the narrowband cancellation signal 325-*b*.

In some aspects, due to the mismatched weights (in examples in which the weight 330-*a* and the weight 330-*b* are different), an EVM of the narrowband transmit signal 310-*a* and the narrowband transmit signal 310-*b* may be equal after applying the narrowband cancellation signal 320-*a* and the narrowband cancellation signal 320-*b* to the narrowband transmit signal 310-*a* and the narrowband transmit signal 310-*b*, respectively (or, equivalently, after applying the wideband cancellation signal 305 to the wideband transmit signal 300). In some implementations, such gain matching capabilities of the wireless communication device 205-*a* may be realized (e.g., provided or achieved) due to cancelling processing with programmable memories (e.g., including the cancellation signal memory 250) and the knowledge of an RB configuration (e.g., of one or more of the wideband transmit signal 300, the narrowband transmit signal 310-*a*, and the narrowband transmit signal 310-*b*).

The wireless communication device 205-*a*, in association with selecting or generating the wideband cancellation signal 305, may scale and/or rotate the wideband cancellation signal 305 in accordance with one or both of a detected/measured peak magnitude and a detected/measured peak angle. Such a peak magnitude and angle may be associated with or refer to a magnitude and angle in an in-phase and quadrature (IQ) domain associated with the wideband transmit signal 300. Thus, in other words, the wireless communication device 205-*a* may additionally scale and/or rotate the wideband cancellation signal 305 to support cancellation of one or more detected peaks in the IQ domain. Accordingly, in some implementations, the wideband cancellation signal 305 may be associated with a combination of two or more narrowband cancellation signals and may further be scaled or rotated prior to application to the wideband transmit signal 300.

Figure 4:
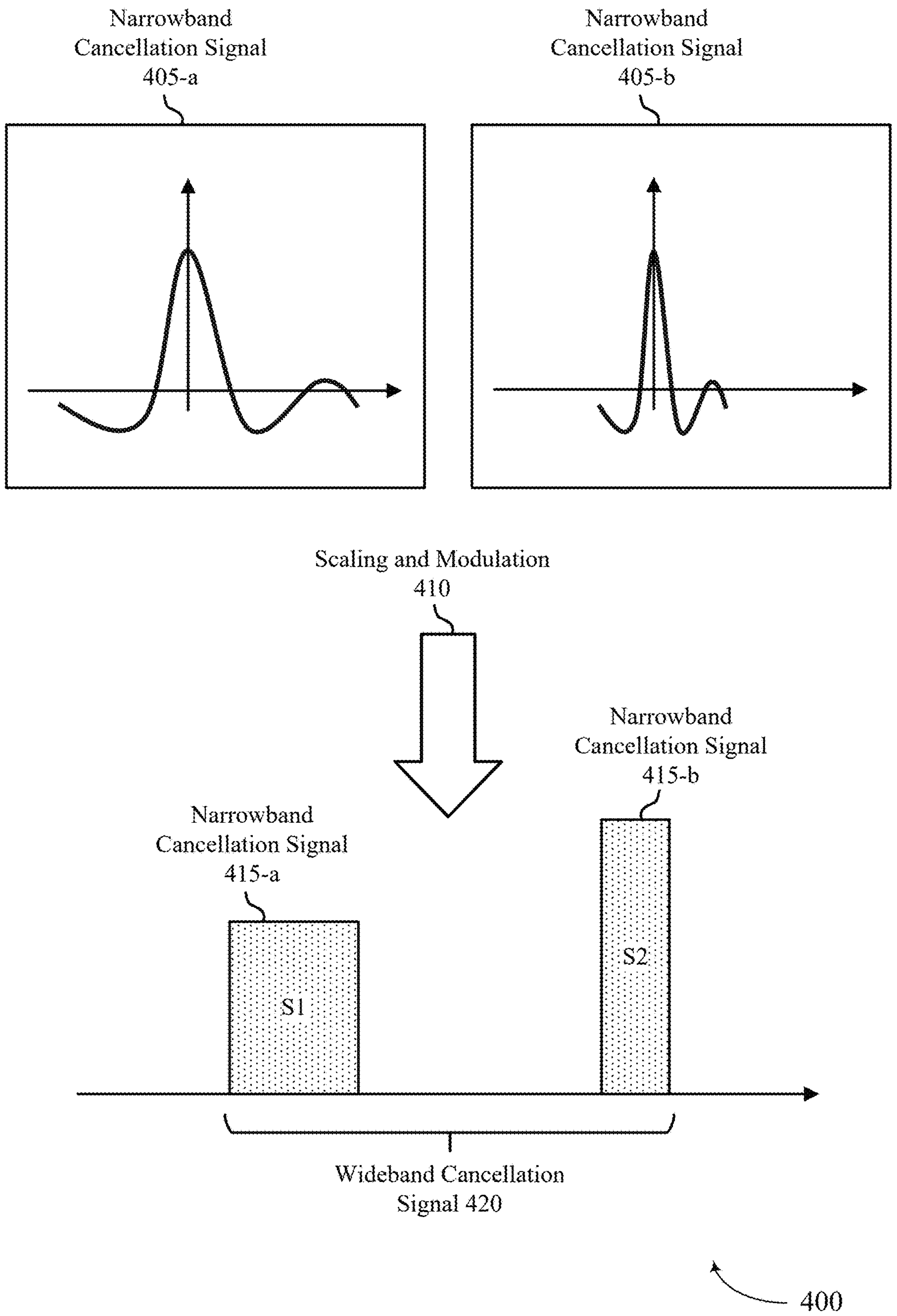
FIG. 4 shows an example of a cancellation signal generation procedure that supports efficient spectral-shaping CFR in accordance with one or more aspects of the present disclosure.

FIG. 4 shows an example of a cancellation signal generation procedure 400 that supports efficient spectral-shaping CFR in accordance with one or more aspects of the present disclosure. The cancellation signal generation procedure 400 may be a procedure according to which a wireless communication device 205-*a* may generate a wideband cancellation signal 420 from one or more narrowband cancellation signals. The wideband cancellation signal 420 may be an example of the cancellation signal 245 or the wideband cancellation signal 305 as illustrated by and described with reference to FIGS. 2 and 3, respectively.

In some aspects, the cancellation signal generation procedure 400 may be associated with a configuration (e.g., a software configuration) flow for achieving a gain-matched CFR, such as a process flow (e.g., a software flow) to prepare the cancellation signal memory 250. For example, the wireless communication device 205-*a* may perform the cancellation signal generation procedure 400 via the one or more cancellation signal generation components 255, as illustrated by and described with reference to FIG. 2. The cancellation signal generation procedure 400 may be used to generate or update a cancellation signal in an online or offline manner, with the generated or updated cancellation signal stored in the cancellation signal memory 250.

The wireless communication device 205-*a* may implement the cancellation signal generation procedure 400 to generate the wideband cancellation signal 420 in accordance with one or more steps. In a first step, the wireless communication device 205-*a* may generate a cancellation signal assuming (e.g., only assuming) a narrowband transmission. The wireless communication device 205-*a* may generate a cancellation signal for each narrowband CC assuming a narrowband transmission (such as not assuming a wideband transmission). For example, the wireless communication device 205-*a* may generate a narrowband cancellation signal 405-*a* for a first CC (e.g., CC1) and may generate a narrowband cancellation signal 405-*b* for a second CC (e.g., CC2). The narrowband cancellation signal 405-*a* as illustrated by FIG. 4 may be associated with a time domain representation of the narrowband cancellation signal 405-*a* for the first CC. Similarly, the narrowband cancellation signal 405-*b* as illustrated by FIG. 4 may be associated with a time domain representation of the narrowband cancellation signal 405-*b* for the second CC. The narrowband cancellation signal 405-*a* and the narrowband cancellation signal 405-*b* may be examples of the narrowband cancellation signal 325-*a* and the narrowband cancellation signal 325-*b*, respectively, as illustrated by and described with reference to FIG. 3.

In a second step, the wireless communication device 205-*a* may evaluate one or more narrowband cancellation weight factors based on a gain deviation of a narrowband transmit signal from a nominal gain for a set of narrowband transmit signals to satisfy (e.g., support, achieve, or meet) an equal power density level of the transmit signal (e.g., of the wideband transmit signal). For example, the wireless communication device 205-*a* may determine or calculate a first weight for the narrowband cancellation signal 405-*a* based on a first gain deviation of a first narrowband transmit signal from a nominal gain for a set of narrowband transmit signals and may determine or calculate a second weight for the narrowband cancellation signal 405-*b* based on a second gain deviation of a second narrowband transmit signal from the nominal gain for the set of narrowband transmit signals.

In some implementations, the wireless communication device 205-*a* may scale each of the narrowband cancellation signal 405-*a* and the narrowband cancellation signal 405-*b* by respective weights (e.g., the first weight and the second weight) and may modulate the narrowband cancellation signal 405-*a* and the narrowband cancellation signal 405-*b* together to form the wideband cancellation signal 420. For example, the wireless communication device 205-*a* may apply a scaling and modulation 410 to the narrowband cancellation signal 405-*a* and the narrowband cancellation signal 405-*b* to obtain the wideband cancellation signal 420. Thus, the wideband cancellation signal 420 may be an example of a wideband cancelling signal after the scaling and modulation 410 of narrowband cancelling signals (e.g., the narrowband cancellation signal 405-*a* and the narrowband cancellation signal 405-*b*). In association with applying the scaling and modulation 410, the wireless communication device 205-*a* may obtain a narrowband cancellation signal 415-*a* and a narrowband cancellation signal 415-*b* included within the wideband cancellation signal 420. The narrowband cancellation signal 415-*a* and the narrowband cancellation signal 415-*b* may be examples of the narrowband cancellation signal 320-*a* and the narrowband cancellation signal 320-*b*, respectively, as illustrated by and described with reference to FIG. 3.

In a third step, the wireless communication device 205-*a* may normalize the wideband cancellation signal 420 to provide (e.g., determine or calculate) a known value at a given sample. In accordance with normalizing the wideband cancellation signal 420, the wireless communication device 205-*a* may store the wideband cancellation signal 420 in memory. For example, the wireless communication device 205-*a* may store the wideband cancellation signal 420 in the cancellation signal memory 250 for the cancelling components 240. Thus, in some implementations, a cancellation signal that the wireless communication device 205-*a* selects from the cancellation signal memory 250 may be a normalized cancellation signal. Accordingly, the wireless communication device 205-*a* may apply a normalized cancellation signal to a transmit signal prior to performing a wireless transmission. Further, in some implementations, the rotation and/or scale that the wireless communication device 205-*a* may apply (online, such as in real time) to a wideband cancellation signal 420 may be set based on a predetermined known value of the wideband cancellation signal 420 in a predetermined known sample. For example, the wireless communication device 205-*a* may set a middle sample of the wideband cancellation signal 420 to a default or baseline value (e.g., a 1 value) and may rotate and scale the wideband cancellation signal 420 to align with a given sample (e.g., 1 given sample) in the transmit signal 220 (e.g., the transmit data). In some aspects, a delay line length may be matching to that prescribed time point so that the transmit signal 220 (e.g., the transmit data), at least for that sample, is set with proper rotating and scaling of the wideband cancellation signal 420 (e.g., the cancelling signal in memory).

In a fourth step, the wireless communication device 205-*a* may select the wideband cancellation signal 420 (or the narrowband cancellation signal 415-*a* and the narrowband cancellation signal 415-*b*) from the cancellation signal memory 250 in association with detecting one or more peaks in a transmit signal. For example, the wireless communication device 205-*a* may detect one or more peaks in a transmit signal in hardware and select the wideband cancellation signal 420 (or the narrowband cancellation signal 415-*a* and the narrowband cancellation signal 415-*b*) based on the peak detection. In some implementations, the wireless communication device 205-*a* may rotate and/or normalize the wideband cancellation signal 420 from the known level (based on the normalization performed in the third step) to generate a final cancellation signal. In association with generating the final cancellation signal, the wireless communication device 205-*a* may apply the final cancellation signal to the transmit signal and perform a wireless transmission. Such a wireless transmission may be a transmission of a signal that is based on (e.g., an outcome or result of) a combination of the transmit signal and the final cancellation signal.

In some implementations, the wireless communication device 205-*a* may generate a cancellation signal, such as the wideband cancellation signal 420, based on an RB configuration. For example, the wireless communication device 205-*a* may generate a cancellation signal based on matching the cancellation signal to RB content information. In other words, the wireless communication device 205-*a* may match a spectral shaping of a CFR distortion to RB content information to support one or more of various (e.g., different) EVM constraints. In some aspects, an RB configuration or content information may be associated with a modulation scheme or type, a code rate, or a quantity or pattern of RBs that are occupied by a transmit signal.

For example, an RB configuration may be associated with a subset of the RBs (e.g., half of the RBs) within a CC being transmitted. In such examples, the wireless communication device 205-*a* may generate a cancellation signal to shape a distortion spectrum to be placed on the non-transmitted RBs and not on the transmitted RBs. In other words, the wireless communication device 205-*a* may generate a cancellation signal such that the cancellation signal introduces a distortion to RBs via which a data signal is not transmitted and avoids introducing a distortion to RBs via which the data signal is transmitted. Additionally, or alternatively, the wireless communication device 205-*a* may generate a cancellation signal to apply different amounts of distortion to different RBs. For example, the wireless communication device 205-*a* may generate a cancellation signal such that a first distortion (e.g., a medium distortion) is applied to a first set of RBs, such that a second distortion (e.g., no distortion) is applied to a second set of RBs, and such that a third distortion (e.g., a heavy distortion) is applied to a third set of RBs.

For further example, an RB configuration may be associated with use of multiple different modulation schemes (e.g., different RB modulation schemes) within a transmit signal. For example, a first set (e.g., a first half) of RBs of a transmit signal may be associated with a first modulation scheme (e.g., 256 quadrature amplitude modulation (QAM)) and a second set (e.g., a second half) of RBs of the transmit signal may be associated with a second modulation scheme (e.g., 4QAM). In such examples, the wireless communication device 205-*a* may generate a cancellation signal to shape the spectrum distortion such that a first amount of distortion is applied to the first set of RBs (e.g., 32 dB EVM on the RBs associated with 256QAM) and a second amount of distortion is applied to the second set of RBs (e.g., 18 dB EVM on the RBs associated with 4QAM). The wireless communication device 205-*a* may generate such a cancellation signal, among other example cancellation signals described herein, in accordance with applying one or more weights to one or more (narrowband) cancellation signals included within the cancellation signal (e.g., in examples in which the cancellation signal is a wideband cancellation signal associated with a combination of two or more narrowband cancellation signals), as illustrated by and described with reference to the example of FIG. 3. In some aspects, such amounts of distortion may be set assuming further degradation or further distortion from one or both of a digital predistortion (DPD) or a power amplifier (PA). Without such flexibility to spectrally shape a cancellation signal to lower PAPR values, the wireless communication device 205-*a* may experience lower levels of EVM for some modulation schemes (e.g., lower EVM at 256QAM), which may adversely impact signal quality or fail to satisfy one or more EVM or spectral constraints.

Additionally, or alternatively, the wireless communication device 205-*a* may generate a cancellation signal, such as the wideband cancellation signal 420, based on a CC configuration. For example, the wireless communication device 205-*a* may generate a cancellation signal to communicate efficiently based on one or more of various potential CC configurations while supporting arbitrary spectral shaping, where such various potential CC configurations may include CC configurations in which occupied CCs are contiguous or non-contiguous with each other or in which different CCs are associated with different power density levels, among other examples. For example, the wireless communication device 205-*a* may generate a cancellation signal based on a transmit signal being associated with two or more CCs with a gap between at least two of the CCs. In such examples, the wireless communication device 205-*a* may use spectral shaping of a cancellation signal to control the distortion to support masking in the gap(s) and outside of the CCs associated with the transmit signal. Additionally, or alternatively, the wireless communication device 205-*a* may generate a cancellation signal based on a variation in power density levels across two or more CCs associated with the transmit signal.

Without such cancellation signal generation based on CC configuration, the wireless communication device 205-*a* may achieve an unsuitable amount of control over spectral mask limitations (such that, for example, CFR distortion may be found in gaps between used CCs). Further, without such cancellation signal generation based on CC configuration, the wireless communication device 205-*a* may experience or cause problematic EVM levels for low power narrowband CCs (with possible 'too good' EVM levels for high power narrowband channels) and may lack freedom of EVM and spectral allocation control. For example, without spectral shaping capabilities, a relatively weaker channel may be heavily degraded while a relatively stronger channel may operate under too good EVM (e.g., unnecessarily low EVM at the expense of failing to meet an EVM constraint in the relatively weaker channel). In other words, other techniques that are agnostic to the narrowband power characteristics of the signals, in cases of non-equal power density levels of the narrowband CCs, the wireless communication device 205-*a* may experience problematically poor EVM levels for the relatively lower power CCs. Moreover, without the described cancellation signal generation techniques, the wireless communication device 205-*a* may operate with high PAPR levels to support a relatively lower power narrowband channel (which may be associated with a poor signal quality or a likelihood for unsuccessful communication), may operate with low modulation index or a low code rate for the relatively lower power narrowband channel (which may hinder or limit an achievable data rate), or may otherwise have limited control of a spectral emission mask, an ACLR, and an EVM.

With such cancellation signal generation based on CC configuration, the wireless communication device 205-*a* may meet both EVM and spectral mask constraints to a prescribed shape. Further, with such cancellation signal generation based on CC configuration, the wireless communication device 205-*a* may set relatively lower EVM levels for narrowband channels of relatively higher modulation order and relatively higher code rates while allowing simultaneously high EVM levels for CCs that are less demanding due to relatively lower modulation levels and relatively lower code rates. Accordingly, the wireless communication device 205-*a* may achieve a relatively similar EVM across multiple channels or CCs, regardless of any variation or deviation in power density between the multiple channels or CCs. Thus, in accordance with some example implementations, the wireless communication device 205-*a* may achieve and support any combination of gain, modulation order, and code rate matching for cancellation signal generation to reduce or mitigate a PAPR of a transmit signal.

Figure 5:
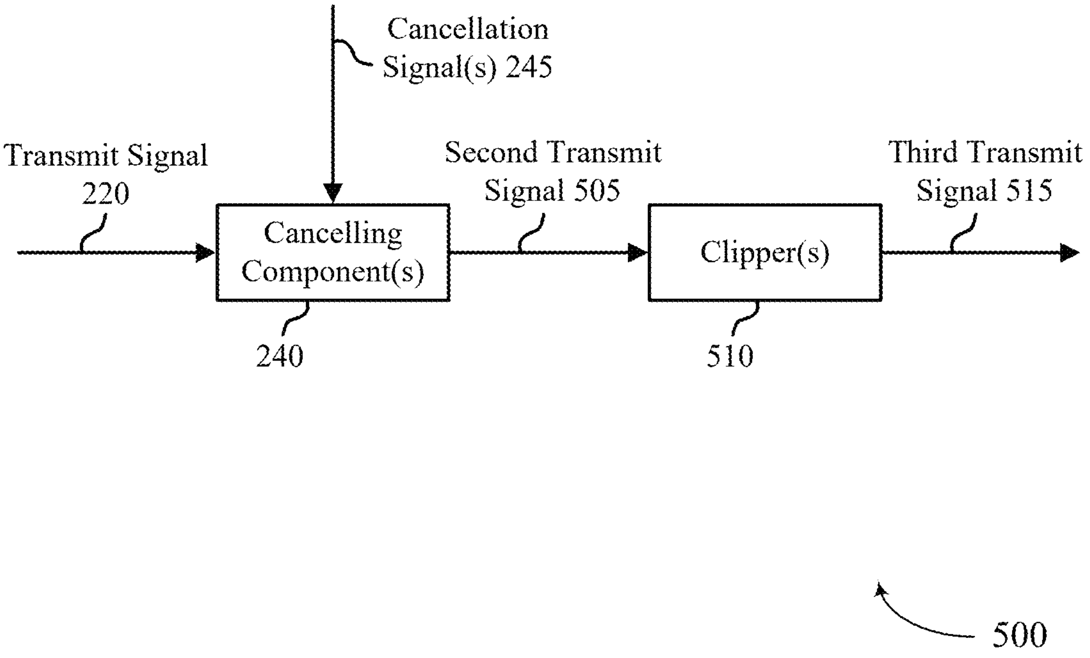
FIG. 5 shows an example of a signal processing sequence that supports efficient spectral-shaping CFR in accordance with one or more aspects of the present disclosure.

FIG. 5 shows an example of a signal processing sequence 500 that supports efficient spectral-shaping CFR in accordance with one or more aspects of the present disclosure. For example, the wireless communication device 205-*a* (as illustrated by and described with reference to FIG. 2) may perform, employ, use, or utilize the signal processing sequence 500 to reduce or mitigate a PAPR associated with a transmit signal 220 (e.g., the transmit signal 220 as illustrated by and described with reference to FIG. 2). The wireless communication device 205-*a* may perform a wireless transmission, such as the wireless transmission 215 as illustrated by and described with reference to FIG. 2, in association with performing the signal processing sequence 500.

In accordance with some example aspects, the wireless communication device 205-*a* may obtain a transmit signal 220 and apply one or more cancellation signals 245 to the transmit signal 220 using one or more cancelling components 240 (which may be in parallel or in series). In some implementations, the wireless communication device 205-*a* may obtain a second transmit signal 505 in association with (e.g., based on) applying the one or more cancellation signals 245 and may apply one or more clippers 510 (which may be in parallel or in series) to the second transmit signal 505. In some implementations, the one or more clippers 510 may be a single clipper 510. The one or more clippers 510 may be set to a different (e.g., lower) target than the cancelling component(s) 240 (e.g., a different, such as lower, target PAPR). In some aspects, a magnitude of a clipper 510 may be based on the one or more cancellation signals 245 applied to the transmit signal 220. For example, the wireless communication device 205-*a* may select a parameter of the cancelling and a parameter of the clipping to match each other, which may further improve performance, such as to provide additional capability to control an EVM metric and an ACLR. The wireless communication device 205-*a* may obtain a third transmit signal 515 in association with (e.g., based on) applying the one or more clippers 510 to the second transmit signal 505.

Accordingly, the wireless communication device 205-*a* may perform a wireless transmission, such as a wireless transmission 215 as illustrated by and described with reference to FIG. 2, using the third transmit signal 515. In other words, the wireless transmission 215 may include or refer to a transmission of the third transmit signal 515. Alternatively, in examples in which the wireless communication device 205-*a* refrains from applying the one or more clippers 510 to the second transmit signal 505, the wireless communication device 205-*a* may perform the wireless transmission 215 using the second transmit signal 505. In such examples, the wireless transmission 215 may include or refer to a transmission of the second transmit signal 505.

Figure 6:
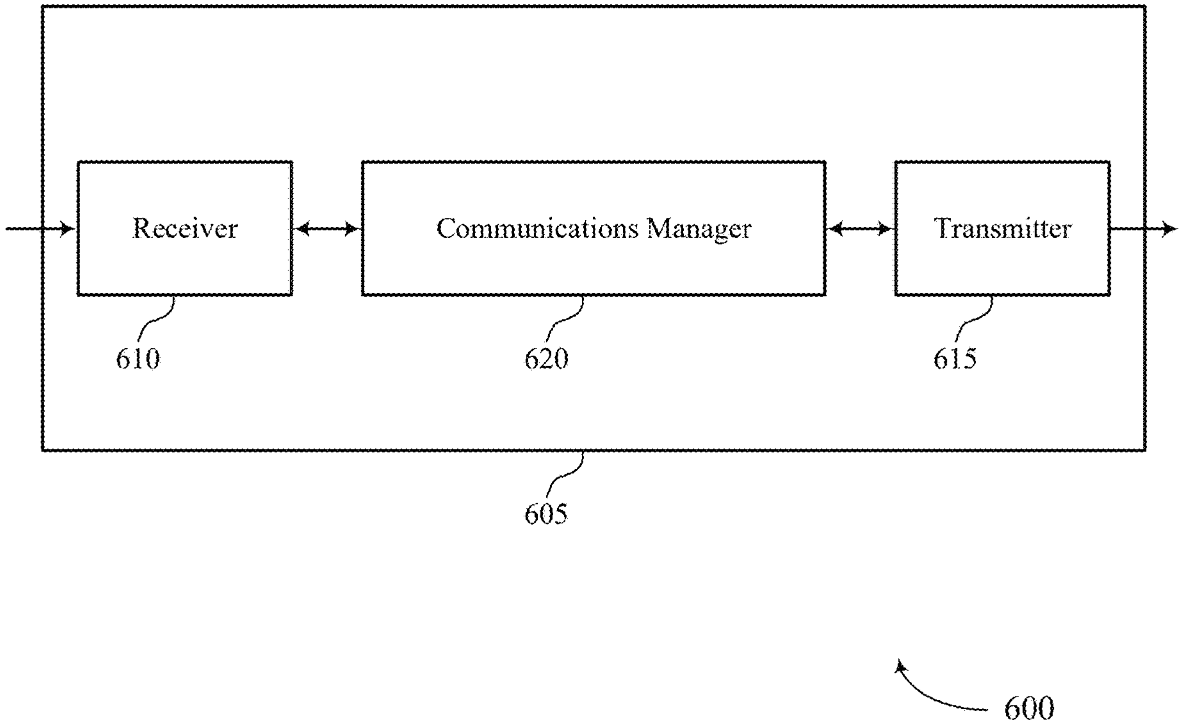
FIGS. 6 and 7 show block diagrams of devices that support efficient spectral-shaping CFR in accordance with one or more aspects of the present disclosure.

FIG. 6 shows a block diagram 600 of a device 605 that supports efficient spectral-shaping CFR in accordance with one or more aspects of the present disclosure. The device 605 may be an example of aspects of a UE 115, a network entity 105, or a wireless communication device 205-*a* as described herein. The device 605 may include a receiver 610, a transmitter 615, and a communications manager 620. The device 605, or one or more components of the device 605 (e.g., the receiver 610, the transmitter 615, the communications manager 620), may include at least one processor, which may be coupled with at least one memory, to, individually or collectively, support or enable the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to efficient spectral-shaping CFR). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to efficient spectral-shaping CFR). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations or components thereof may be examples of means for performing various aspects of efficient spectral-shaping CFR as described herein. For example, the communications manager 620, the receiver 610, the transmitter 615, or various combinations or components thereof may be capable of performing one or more of the functions described herein.

In some examples, the communications manager 620, the receiver 610, the transmitter 615, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 620, the receiver 610, the transmitter 615, or various combinations or components thereof may be implemented in code (e.g., as communications management software or firmware) executed by at least one processor (e.g., referred to as a processor-executable code). If implemented in code executed by at least one processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication in accordance with examples as disclosed herein. For example, the communications manager 620 is capable of, configured to, or operable to support a means for obtaining a transmit signal. The communications manager 620 is capable of, configured to, or operable to support a means for detecting one or more peaks associated with a power level of the transmit signal. The communications manager 620 is capable of, configured to, or operable to support a means for selecting, from one or more memories associated with the wireless communication device, one or more cancellation signals based on the one or more peaks associated with the power level of the transmit signal. The communications manager 620 is capable of, configured to, or operable to support a means for performing a wireless transmission in association with applying the one or more cancellation signals to the transmit signal.

Additionally, or alternatively, the communications manager 620 may support wireless communication in accordance with examples as disclosed herein. For example, the communications manager 620 is capable of, configured to, or operable to support a means for receiving information indicative of one or more transmission configurations of the wireless communication device, where the one or more transmission configurations are based on one or more component carrier configurations or one or more resource block configurations, or both. The communications manager 620 is capable of, configured to, or operable to support a means for generating a set of multiple cancellation signals based on the one or more transmission configurations of the wireless communication device. The communications manager 620 is capable of, configured to, or operable to support a means for storing the set of multiple cancellation signals in one or more memories associated with the wireless communication device.

By including or configuring the communications manager 620 in accordance with examples as described herein, the device 605 (e.g., at least one processor controlling or otherwise coupled with the receiver 610, the transmitter 615, the communications manager 620, or a combination thereof) may support techniques for reduced processing, reduced power consumption, and more efficient utilization of communication resources.

Figure 7:
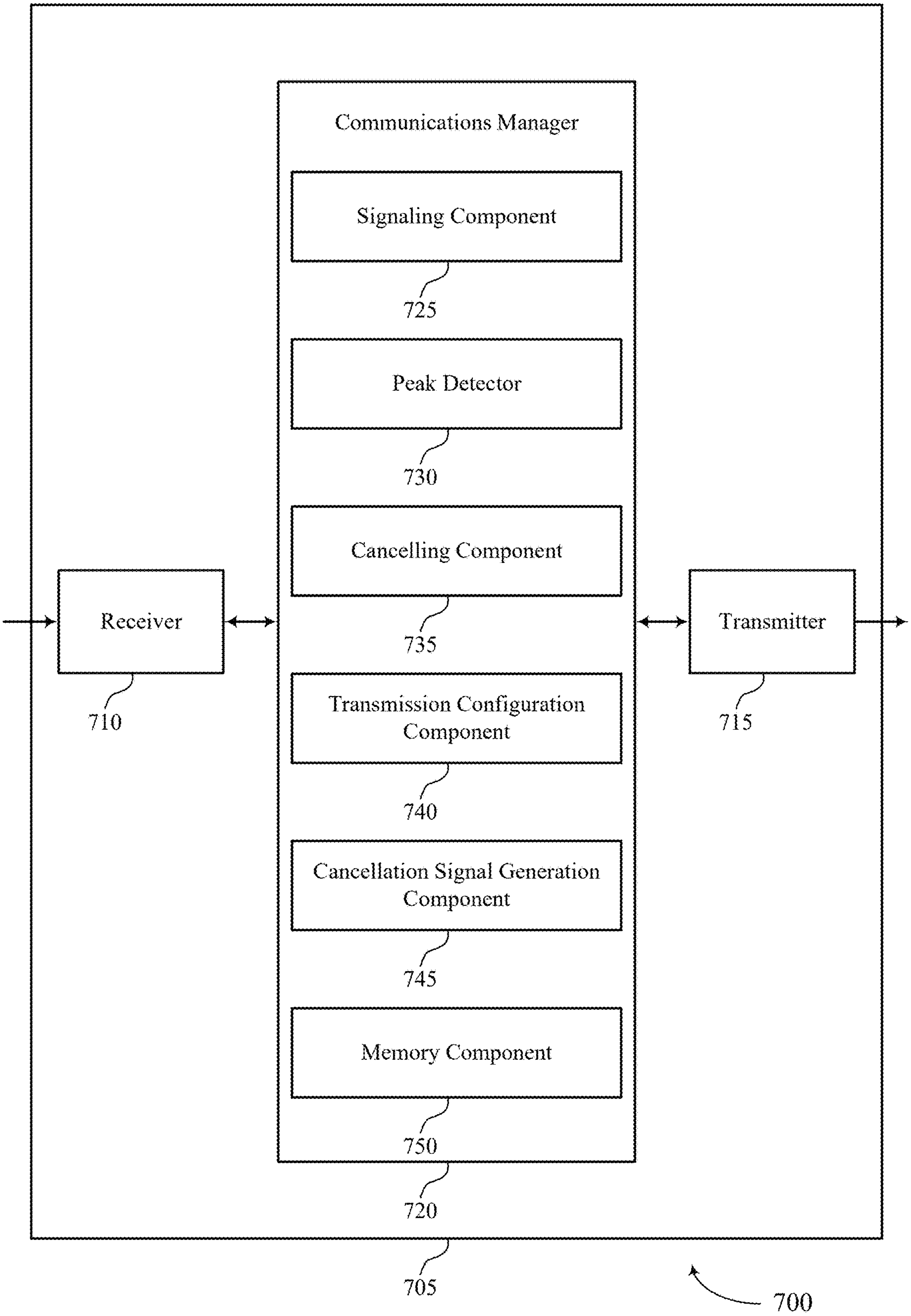

FIG. 7 shows a block diagram 700 of a device 705 that supports efficient spectral-shaping CFR in accordance with one or more aspects of the present disclosure. The device 705 may be an example of aspects of a device 605, a UE 115, a network entity 105, or a wireless communication device 205-*a* as described herein. The device 705 may include a receiver 710, a transmitter 715, and a communications manager 720. The device 705, or one or more components of the device 705 (e.g., the receiver 710, the transmitter 715, the communications manager 720), may include at least one processor, which may be coupled with at least one memory, to support the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to efficient spectral-shaping CFR). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to efficient spectral-shaping CFR). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of efficient spectral-shaping CFR as described herein. For example, the communications manager 720 may include a signaling component 725, a peak detector 730, a cancelling component 735, a transmission configuration component 740, a cancellation signal generation component 745, a memory component 750, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication in accordance with examples as disclosed herein. The signaling component 725 is capable of, configured to, or operable to support a means for obtaining a transmit signal. The peak detector 730 is capable of, configured to, or operable to support a means for detecting one or more peaks associated with a power level of the transmit signal. The cancelling component 735 is capable of, configured to, or operable to support a means for selecting, from one or more memories associated with the wireless communication device, one or more cancellation signals based on the one or more peaks associated with the power level of the transmit signal. The signaling component 725 is capable of, configured to, or operable to support a means for performing a wireless transmission in association with applying the one or more cancellation signals to the transmit signal.

Additionally, or alternatively, the communications manager 720 may support wireless communication in accordance with examples as disclosed herein. The transmission configuration component 740 is capable of, configured to, or operable to support a means for receiving information indicative of one or more transmission configurations of the wireless communication device, where the one or more transmission configurations are based on one or more component carrier configurations or one or more resource block configurations, or both. The cancellation signal generation component 745 is capable of, configured to, or operable to support a means for generating a set of multiple cancellation signals based on the one or more transmission configurations of the wireless communication device. The memory component 750 is capable of, configured to, or operable to support a means for storing the set of multiple cancellation signals in one or more memories associated with the wireless communication device.

Figure 8:
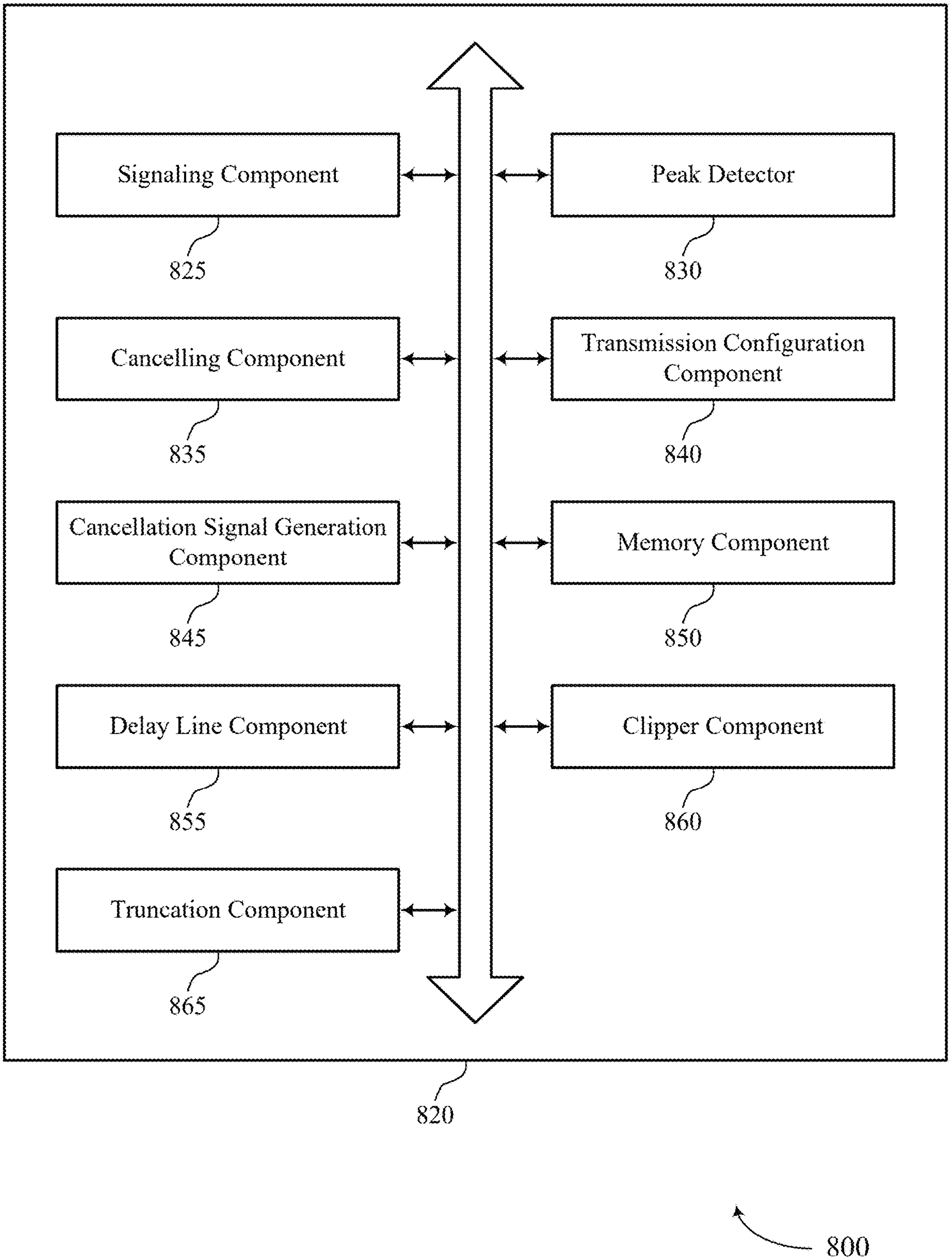
FIG. 8 shows a block diagram of a communications manager that supports efficient spectral-shaping CFR in accordance with one or more aspects of the present disclosure.

FIG. 8 shows a block diagram 800 of a communications manager 820 that supports efficient spectral-shaping CFR in accordance with one or more aspects of the present disclosure. The communications manager 820 may be an example of aspects of a communications manager 620, a communications manager 720, or both, as described herein. The communications manager 820, or various components thereof, may be an example of means for performing various aspects of efficient spectral-shaping CFR as described herein. For example, the communications manager 820 may include a signaling component 825, a peak detector 830, a cancelling component 835, a transmission configuration component 840, a cancellation signal generation component 845, a memory component 850, a delay line component 855, a clipper component 860, a truncation component 865, or any combination thereof. Each of these components, or components or subcomponents thereof (e.g., one or more processors, one or more memories), may communicate, directly or indirectly, with one another (e.g., via one or more buses). The communications may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 820 may support wireless communication in accordance with examples as disclosed herein. The signaling component 825 is capable of, configured to, or operable to support a means for obtaining a transmit signal. The peak detector 830 is capable of, configured to, or operable to support a means for detecting one or more peaks associated with a power level of the transmit signal. The cancelling component 835 is capable of, configured to, or operable to support a means for selecting, from one or more memories associated with the wireless communication device, one or more cancellation signals based on the one or more peaks associated with the power level of the transmit signal. In some examples, the signaling component 825 is capable of, configured to, or operable to support a means for performing a wireless transmission in association with applying the one or more cancellation signals to the transmit signal.

In some examples, the delay line component 855 is capable of, configured to, or operable to support a means for delaying the transmit signal to obtain a delayed transmit signal. In some examples, the cancelling component 835 is capable of, configured to, or operable to support a means for applying the one or more cancellation signals to the delayed transmit signal, where performing the wireless transmission is in association with applying the one or more cancellation signals to the delayed transmit signal.

In some examples, the truncation component 865 is capable of, configured to, or operable to support a means for truncating the delayed transmit signal to obtain a portion of the delayed transmit signal, where applying the one or more cancellation signals to the delayed transmit signal includes applying the one or more cancellation signals to the portion of the delayed transmit signal.

In some examples, the cancelling component 835 is capable of, configured to, or operable to support a means for scaling the one or more cancellation signals based on one or more magnitudes of the one or more peaks to obtain a scaled one or more cancellation signals. In some examples, the cancelling component 835 is capable of, configured to, or operable to support a means for applying the scaled one or more cancellation signals to the transmit signal, where performing the wireless transmission is in association with applying the scaled one or more cancellation signals to the transmit signal.

In some examples, the cancelling component 835 is capable of, configured to, or operable to support a means for rotating the one or more cancellation signals based on one or more angles of the one or more peaks to obtain a rotated one or more cancellation signals. In some examples, the cancelling component 835 is capable of, configured to, or operable to support a means for applying the rotated one or more cancellation signals to the transmit signal, where performing the wireless transmission is in association with applying the rotated one or more cancellation signals to the transmit signal.

In some examples, the cancelling component 835 is capable of, configured to, or operable to support a means for obtaining a second transmit signal in association with applying the one or more cancellation signals to the transmit signal. In some examples, the clipper component 860 is capable of, configured to, or operable to support a means for applying a clipper to the second transmit signal, where a magnitude of the clipper is based on the one or more cancellation signals, and where performing the wireless transmission is in association with applying the clipper to the second transmit signal.

In some examples, the transmit signal is a wideband transmit signal associated with a set of multiple narrowband transmit signals. In some examples, the one or more cancellation signals are associated with a set of multiple narrowband cancellation signals that correspond to the set of multiple narrowband transmit signals, each narrowband cancellation signal of the set of multiple narrowband cancellation signals corresponding to a respective narrowband transmit signal of the set of multiple narrowband transmit signals.

In some examples, the cancelling component 835 is capable of, configured to, or operable to support a means for combining the set of multiple narrowband cancellation signals to obtain a wideband cancellation signal. In some examples, the cancelling component 835 is capable of, configured to, or operable to support a means for applying the wideband cancellation signal to the wideband transmit signal, where performing the wireless transmission is in association with applying the wideband cancellation signal to the wideband transmit signal.

In some examples, the wideband cancellation signal is based on a modulated summation of the set of multiple narrowband cancellation signals.

In some examples, to support combining the set of multiple narrowband cancellation signals to obtain the wideband cancellation signal, the cancelling component 835 is capable of, configured to, or operable to support a means for applying a respective weight to each narrowband cancellation signal of the set of multiple narrowband cancellation signals to obtain a weighted set of multiple narrowband cancellation signals. In some examples, to support combining the set of multiple narrowband cancellation signals to obtain the wideband cancellation signal, the cancelling component 835 is capable of, configured to, or operable to support a means for combining the weighted set of multiple narrowband cancellation signals to obtain the wideband cancellation signal.

In some examples, the set of multiple narrowband transmit signals is associated with a variation in power density levels between different narrowband transmit signals of the set of multiple narrowband transmit signals. In some examples, the respective weight applied to each narrowband cancellation signal of the set of multiple narrowband cancellation signals is based on a deviation of gains between the set of multiple narrowband transmit signals to obtain an equal power density level across the wideband transmit signal. In some examples, the deviation of gains between the set of multiple narrowband transmit signals is based on the variation in power density levels between the different narrowband transmit signals of the set of multiple narrowband transmit signals.

In some examples, the cancelling component 835 is capable of, configured to, or operable to support a means for normalizing the wideband cancellation signal to obtain a normalized wideband cancellation signal. In some examples, the memory component 850 is capable of, configured to, or operable to support a means for storing the normalized wideband cancellation signal in the one or more memories associated with the wireless communication device, where selecting the one or more cancellation signals includes selecting the normalized wideband cancellation signal, and where applying the wideband cancellation signal to the wideband transmit signal includes applying the normalized wideband cancellation signal to the wideband transmit signal.

In some examples, the cancelling component 835 is capable of, configured to, or operable to support a means for applying each narrowband cancellation signal of the set of multiple narrowband cancellation signals corresponding to the respective narrowband transmit signal of the set of multiple narrowband transmit signals, where performing the wireless transmission is in association with applying each narrowband cancellation signal to the respective narrowband transmit signal.

In some examples, the one or more cancellation signals are further selected based on a transmission configuration of the wireless communication device, one or more threshold spectrum interference levels, one or more threshold distortion levels, or any combination thereof. In some examples, the transmission configuration is based on a component carrier configuration associated with the transmit signal or a resource block configuration associated with the transmit signal, or both.

In some examples, in accordance with selecting the one or more cancellation signals based on the resource block configuration associated with the transmit signal, the one or more cancellation signals are based on one or more modulation schemes associated with the transmit signal, one or more coding rates associated with the transmit signal, or a set of resource blocks within a component carrier associated with the transmit signal.

In some examples, in accordance with selecting the one or more cancellation signals based on the component carrier configuration associated with the transmit signal, the one or more cancellation signals are based on one or more gaps between two or more component carriers associated with the transmit signal or one or more power density levels of one or more component carriers associated with the transmit signal.

Additionally, or alternatively, the communications manager 820 may support wireless communication in accordance with examples as disclosed herein. The transmission configuration component 840 is capable of, configured to, or operable to support a means for receiving information indicative of one or more transmission configurations of the wireless communication device, where the one or more transmission configurations are based on one or more component carrier configurations or one or more resource block configurations, or both. The cancellation signal generation component 845 is capable of, configured to, or operable to support a means for generating a set of multiple cancellation signals based on the one or more transmission configurations of the wireless communication device. The memory component 850 is capable of, configured to, or operable to support a means for storing the set of multiple cancellation signals in one or more memories associated with the wireless communication device.

In some examples, the cancellation signal generation component 845 is capable of, configured to, or operable to support a means for receiving second information indicative of one or more threshold spectrum interference levels or one or more threshold distortion levels, where generating the set of multiple cancellation signals is further based on the one or more threshold spectrum interference levels or the one or more threshold distortion levels.

In some examples, the set of multiple cancellation signals includes a set of wideband cancellation signals.

In some examples, to support generating the set of wideband cancellation signals, the cancellation signal generation component 845 is capable of, configured to, or operable to support a means for generating a set of multiple narrowband cancellation signals based on the one or more transmission configurations of the wireless communication device and based on one or more threshold spectrum interference levels or one or more threshold distortion levels. In some examples, to support generating the set of wideband cancellation signals, the cancellation signal generation component 845 is capable of, configured to, or operable to support a means for combining the set of multiple narrowband cancellation signals to obtain the set of wideband cancellation signals.

In some examples, to support combining the set of multiple narrowband cancellation signals to obtain the set of wideband cancellation signals, the cancellation signal generation component 845 is capable of, configured to, or operable to support a means for combining a first set of multiple narrowband cancellation signals to obtain a first wideband cancellation signal. In some examples, to support combining the set of multiple narrowband cancellation signals to obtain the set of wideband cancellation signals, the cancellation signal generation component 845 is capable of, configured to, or operable to support a means for combining a second set of multiple narrowband cancellation signals to obtain a second wideband cancellation signal.

In some examples, the first wideband cancellation signal is based on a first modulated summation of the first set of multiple narrowband cancellation signals and is associated with a first transmission configuration of the one or more transmission configurations. In some examples, the second wideband cancellation signal is based on a second modulated summation of the second set of multiple narrowband cancellation signals and is associated with a second transmission configuration of the one or more transmission configurations.

In some examples, the cancellation signal generation component 845 is capable of, configured to, or operable to support a means for applying a first respective weight to each narrowband cancellation signal of the first set of multiple narrowband cancellation signals to obtain a weighted first set of multiple narrowband cancellation signals, where obtaining the first wideband cancellation signal is based on combining the weighted first set of multiple narrowband cancellation signals. In some examples, the cancellation signal generation component 845 is capable of, configured to, or operable to support a means for applying a second respective weight to each narrowband cancellation signal of the second set of multiple narrowband cancellation signals to obtain a weighted second set of multiple narrowband cancellation signals, where obtaining the second wideband cancellation signal is based on combining the weighted second set of multiple narrowband cancellation signals.

In some examples, the first respective weight applied to each narrowband cancellation signal of the first set of multiple narrowband cancellation signals is based on a first variation in power density levels between different narrowband transmit signals associated with a first transmit signal. In some examples, the second respective weight applied to each narrowband cancellation signal of the second set of multiple narrowband cancellation signals is based on a second variation in power density levels between different narrowband transmit signals associated with a second transmit signal.

In some examples, the cancellation signal generation component 845 is capable of, configured to, or operable to support a means for normalizing the first wideband cancellation signal to obtain a normalized first wideband cancellation signal, where storing the set of multiple cancellation signals includes storing the normalized first wideband cancellation signal. In some examples, the cancellation signal generation component 845 is capable of, configured to, or operable to support a means for normalizing the second wideband cancellation signal to obtain a normalized second wideband cancellation signal, where storing the set of multiple cancellation signals includes storing the normalized second wideband cancellation signal.

In some examples, each wideband cancellation signal of the set of wideband cancellation signals is based on a respective transmission configuration of the one or more transmission configurations of the wireless communication device.

In some examples, the set of multiple cancellation signals includes a set of narrowband cancellation signals.

In some examples, each narrowband cancellation signal of the set of narrowband cancellation signals corresponds to a respective component carrier of a set of component carriers, the set of component carriers based on the one or more component carrier configurations.

In some examples, to support generating the set of multiple cancellation signals, the cancellation signal generation component 845 is capable of, configured to, or operable to support a means for generating the set of multiple cancellation signals based on one or more modulation schemes, one or more coding rates, or a set of resource blocks within a component carrier in accordance with the one or more resource block configurations.

In some examples, to support generating the set of multiple cancellation signals, the cancellation signal generation component 845 is capable of, configured to, or operable to support a means for generating the set of multiple cancellation signals based on one or more gaps between two or more component carriers or one or more power density levels of one or more component carriers in accordance with the one or more component carrier configurations.

In some examples, the cancellation signal generation component 845 is capable of, configured to, or operable to support a means for updating, based on one or more configured parameters or based on feedback associated with one or more wireless transmissions by the wireless communication device, one or more cancellation signals of the set of multiple cancellation signals to obtain an updated one or more cancellation signals. In some examples, the memory component 850 is capable of, configured to, or operable to support a means for storing the updated one or more cancellation signals in the one or more memories associated with the wireless communication device.

In some examples, the signaling component 825 is capable of, configured to, or operable to support a means for performing one or more wireless transmissions in association with applying one or more cancellation signals, from the set of multiple cancellation signals stored in the one or more memories, to one or more transmit signals, where a selection of the one or more cancellation signals, from the set of multiple cancellation signals stored in the one or more memories, is based on one or more peaks associated with a power level of the one or more transmit signals.

Figure 9:
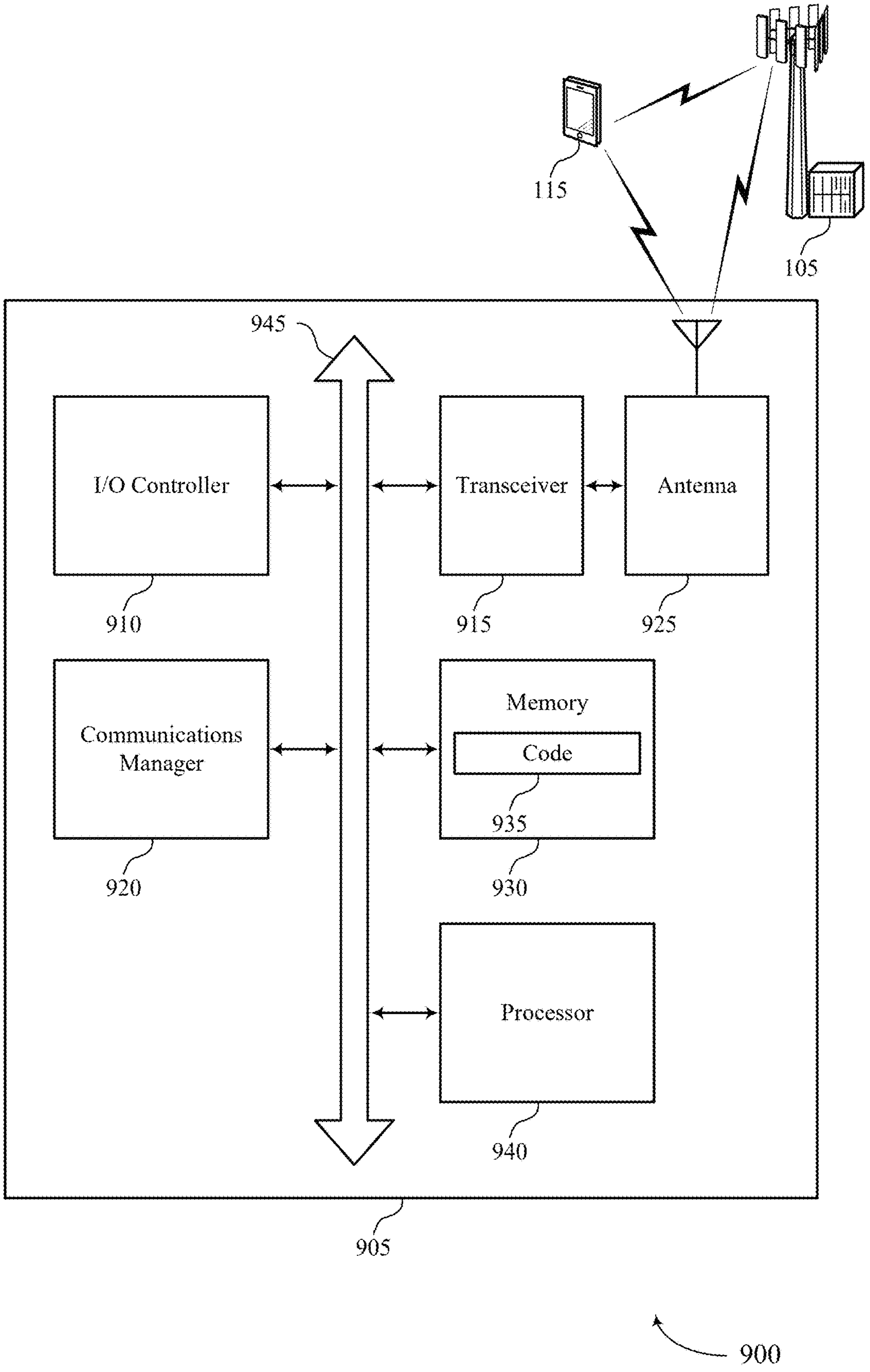
FIG. 9 shows a diagram of a system including a UE that supports efficient spectral-shaping CFR in accordance with one or more aspects of the present disclosure.

FIG. 9 shows a diagram of a system 900 including a device 905 that supports efficient spectral-shaping CFR in accordance with one or more aspects of the present disclosure. The device 905 may be an example of or include components of a device 605, a device 705, a UE 115, or a wireless communication device 205-*a* as described herein. The device 905 may communicate (e.g., wirelessly) with one or more other devices (e.g., network entities 105, UEs 115, or a combination thereof). The device 905 may include components for bi-directional voice and data communications including components for transmitting and receiving communications, such as a communications manager 920, an input/output (I/O) controller, such as an I/O controller 910, a transceiver 915, one or more antennas 925, at least one memory 930, code 935, and at least one processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of one or more processors, such as the at least one processor 940. In some cases, a user may interact with the device 905 via the I/O controller 910 or via hardware components controlled by the I/O controller 910.

In some cases, the device 905 may include a single antenna. However, in some other cases, the device 905 may have more than one antenna, which may be capable of concurrently transmitting or receiving multiple wireless transmissions. The transceiver 915 may communicate bi-directionally via the one or more antennas 925 using wired or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The at least one memory 930 may include random access memory (RAM) and read-only memory (ROM). The at least one memory 930 may store computer-readable, computer-executable, or processor-executable code, such as the code 935. In some aspects, the at least one memory 930 may be referred to herein as one or more first memories, which may be the same as or different from one or more second memories that store one or more cancellation signals. For example, a same set of one or more memories may store both processor-executable code and cancellation signals. Additionally, or alternatively, a first set of one or more memories may store processor-executable code and a second set of one or more memories may store cancellation signals.

The code 935 may include instructions that, when executed by the at least one processor 940, cause the device 905 to perform various functions described herein. The code 935 may be stored in a non-transitory computer-readable medium such as system memory or another type of memory. In some cases, the code 935 may not be directly executable by the at least one processor 940 but may cause a computer (e.g., when compiled and executed) to perform functions described herein. In some cases, the at least one memory 930 may include, among other things, a basic I/O system (BIOS) which may control basic hardware or software operation such as the interaction with peripheral components or devices.

The at least one processor 940 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 940 may be configured to operate a memory array using a memory controller. In some other cases, a memory controller may be integrated into the at least one processor 940. The at least one processor 940 may be configured to execute computer-readable instructions stored in a memory (e.g., the at least one memory 930) to cause the device 905 to perform various functions (e.g., functions or tasks supporting efficient spectral-shaping CFR). For example, the device 905 or a component of the device 905 may include at least one processor 940 and at least one memory 930 coupled with or to the at least one processor 940, the at least one processor 940 and the at least one memory 930 configured to perform various functions described herein.

In some examples, the at least one processor 940 may include multiple processors and the at least one memory 930 may include multiple memories. One or more of the multiple processors may be coupled with one or more of the multiple memories, which may, individually or collectively, be configured to perform various functions described herein. In some examples, the at least one processor 940 may be a component of a processing system, which may refer to a system (such as a series) of machines, circuitry (including, for example, one or both of processor circuitry (which may include the at least one processor 940) and memory circuitry (which may include the at least one memory 930)), or components, that receives or obtains inputs and processes the inputs to produce, generate, or obtain a set of outputs. The processing system may be configured to perform one or more of the functions described herein. For example, the at least one processor 940 or a processing system including the at least one processor 940 may be configured to, configurable to, or operable to cause the device 905 to perform one or more of the functions described herein. Further, as described herein, being "configured to," being "configurable to," and being "operable to" may be used interchangeably and may be associated with a capability, when executing code 935 (e.g., processor-executable code) stored in the at least one memory 930 or otherwise, to perform one or more of the functions described herein.

The communications manager 920 may support wireless communication in accordance with examples as disclosed herein. For example, the communications manager 920 is capable of, configured to, or operable to support a means for obtaining a transmit signal. The communications manager 920 is capable of, configured to, or operable to support a means for detecting one or more peaks associated with a power level of the transmit signal. The communications manager 920 is capable of, configured to, or operable to support a means for selecting, from one or more memories associated with the wireless communication device, one or more cancellation signals based on the one or more peaks associated with the power level of the transmit signal. The communications manager 920 is capable of, configured to, or operable to support a means for performing a wireless transmission in association with applying the one or more cancellation signals to the transmit signal.

Additionally, or alternatively, the communications manager 920 may support wireless communication in accordance with examples as disclosed herein. For example, the communications manager 920 is capable of, configured to, or operable to support a means for receiving information indicative of one or more transmission configurations of the wireless communication device, where the one or more transmission configurations are based on one or more component carrier configurations or one or more resource block configurations, or both. The communications manager 920 is capable of, configured to, or operable to support a means for generating a set of multiple cancellation signals based on the one or more transmission configurations of the wireless communication device. The communications manager 920 is capable of, configured to, or operable to support a means for storing the set of multiple cancellation signals in one or more memories associated with the wireless communication device.

By including or configuring the communications manager 920 in accordance with examples as described herein, the device 905 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the at least one processor 940, the at least one memory 930, the code 935, or any combination thereof. For example, the code 935 may include instructions executable by the at least one processor 940 to cause the device 905 to perform various aspects of efficient spectral-shaping CFR as described herein, or the at least one processor 940 and the at least one memory 930 may be otherwise configured to, individually or collectively, perform or support such operations.

Figure 10:
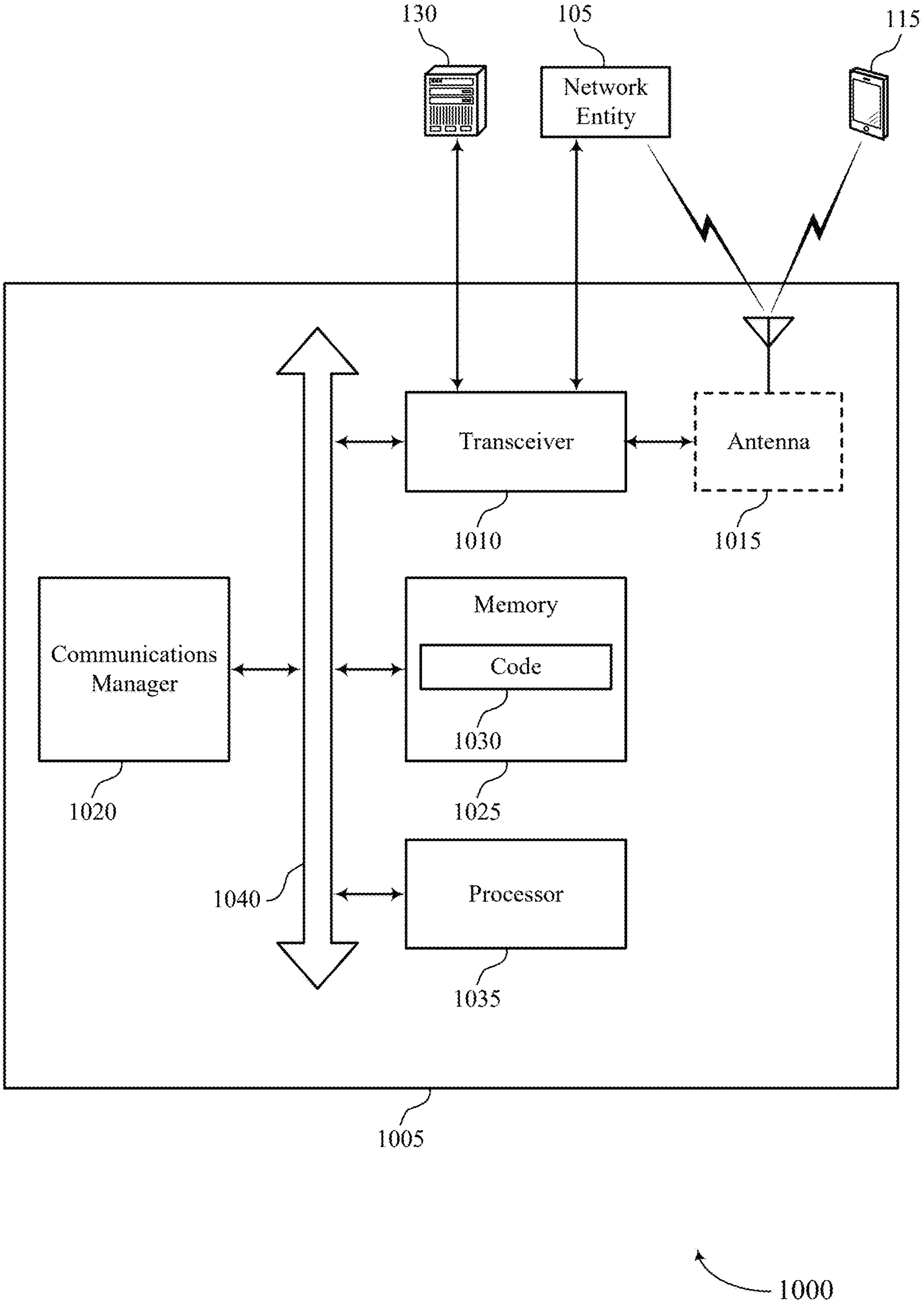
FIG. 10 shows a diagram of a system including a network entity that supports efficient spectral-shaping CFR in accordance with one or more aspects of the present disclosure.

FIG. 10 shows a diagram of a system 1000 including a device 1005 that supports efficient spectral-shaping CFR in accordance with one or more aspects of the present disclosure. The device 1005 may be an example of or include components of a device 605, a device 705, a network entity 105, or a wireless communication device 205-*a* as described herein. The device 1005 may communicate with other network devices or network equipment such as one or more of the network entities 105, UEs 115, or any combination thereof. The communications may include communications over one or more wired interfaces, over one or more wireless interfaces, or any combination thereof. The device 1005 may include components that support outputting and obtaining communications, such as a communications manager 1020, a transceiver 1010, one or more antennas 1015, at least one memory 1025, code 1030, and at least one processor 1035. These components may be in electronic communication or otherwise coupled (e.g., operatively, communicatively, functionally, electronically, electrically) via one or more buses (e.g., a bus 1040).

The transceiver 1010 may support bi-directional communications via wired links, wireless links, or both as described herein. In some examples, the transceiver 1010 may include a wired transceiver and may communicate bi-directionally with another wired transceiver. Additionally, or alternatively, in some examples, the transceiver 1010 may include a wireless transceiver and may communicate bi-directionally with another wireless transceiver. In some examples, the device 1005 may include one or more antennas 1015, which may be capable of transmitting or receiving wireless transmissions (e.g., concurrently). The transceiver 1010 may also include a modem to modulate signals, to provide the modulated signals for transmission (e.g., by one or more antennas 1015, by a wired transmitter), to receive modulated signals (e.g., from one or more antennas 1015, from a wired receiver), and to demodulate signals. In some implementations, the transceiver 1010 may include one or more interfaces, such as one or more interfaces coupled with the one or more antennas 1015 that are configured to support various receiving or obtaining operations, or one or more interfaces coupled with the one or more antennas 1015 that are configured to support various transmitting or outputting operations, or a combination thereof. In some implementations, the transceiver 1010 may include or be configured for coupling with one or more processors or one or more memory components that are operable to perform or support operations based on received or obtained information or signals, or to generate information or other signals for transmission or other outputting, or any combination thereof. In some implementations, the transceiver 1010, or the transceiver 1010 and the one or more antennas 1015, or the transceiver 1010 and the one or more antennas 1015 and one or more processors or one or more memory components (e.g., the at least one processor 1035, the at least one memory 1025, or both), may be included in a chip or chip assembly that is installed in the device 1005. In some examples, the transceiver 1010 may be operable to support communications via one or more communications links (e.g., communication link(s) 125, backhaul communication link(s) 120, a midhaul communication link 162, a fronthaul communication link 168).

The at least one memory 1025 may include RAM, ROM, or any combination thereof. The at least one memory 1025 may store computer-readable, computer-executable, or processor-executable code, such as the code 1030. In some aspects, the at least one memory 1025 may be referred to herein as one or more first memories, which may be the same as or different from one or more second memories that store one or more cancellation signals. For example, a same set of one or more memories may store both processor-executable code and cancellation signals. Additionally, or alternatively, a first set of one or more memories may store processor-executable code and a second set of one or more memories may store cancellation signals.

The code 1030 may include instructions that, when executed by one or more of the at least one processor 1035, cause the device 1005 to perform various functions described herein. The code 1030 may be stored in a non-transitory computer-readable medium such as system memory or another type of memory. In some cases, the code 1030 may not be directly executable by a processor of the at least one processor 1035 but may cause a computer (e.g., when compiled and executed) to perform functions described herein. In some cases, the at least one memory 1025 may include, among other things, a BIOS which may control basic hardware or software operation such as the interaction with peripheral components or devices. In some examples, the at least one processor 1035 may include multiple processors and the at least one memory 1025 may include multiple memories. One or more of the multiple processors may be coupled with one or more of the multiple memories which may, individually or collectively, be configured to perform various functions herein (for example, as part of a processing system).

The at least one processor 1035 may include one or more intelligent hardware devices (e.g., one or more general-purpose processors, one or more DSPs, one or more CPUs, one or more GPUs, one or more NPUs (also referred to as neural network processors or DLPs), one or more microcontrollers, one or more ASICs, one or more FPGAs, one or more programmable logic devices, discrete gate or transistor logic, one or more discrete hardware components, or any combination thereof). In some cases, the at least one processor 1035 may be configured to operate a memory array using a memory controller. In some other cases, a memory controller may be integrated into one or more of the at least one processor 1035. The at least one processor 1035 may be configured to execute computer-readable instructions stored in a memory (e.g., one or more of the at least one memory 1025) to cause the device 1005 to perform various functions (e.g., functions or tasks supporting efficient spectral-shaping CFR). For example, the device 1005 or a component of the device 1005 may include at least one processor 1035 and at least one memory 1025 coupled with one or more of the at least one processor 1035, the at least one processor 1035 and the at least one memory 1025 configured to perform various functions described herein. The at least one processor 1035 may be an example of a cloud-computing platform (e.g., one or more physical nodes and supporting software such as operating systems, virtual machines, or container instances) that may host the functions (e.g., by executing code 1030) to perform the functions of the device 1005. The at least one processor 1035 may be any one or more suitable processors capable of executing scripts or instructions of one or more software programs stored in the device 1005 (such as within one or more of the at least one memory 1025).

In some examples, the at least one processor 1035 may include multiple processors and the at least one memory 1025 may include multiple memories. One or more of the multiple processors may be coupled with one or more of the multiple memories, which may, individually or collectively, be configured to perform various functions herein. In some examples, the at least one processor 1035 may be a component of a processing system, which may refer to a system (such as a series) of machines, circuitry (including, for example, one or both of processor circuitry (which may include the at least one processor 1035) and memory circuitry (which may include the at least one memory 1025)), or components, that receives or obtains inputs and processes the inputs to produce, generate, or obtain a set of outputs. The processing system may be configured to perform one or more of the functions described herein. For example, the at least one processor 1035 or a processing system including the at least one processor 1035 may be configured to, configurable to, or operable to cause the device 1005 to perform one or more of the functions described herein. Further, as described herein, being "configured to," being "configurable to," and being "operable to" may be used interchangeably and may be associated with a capability, when executing code stored in the at least one memory 1025 or otherwise, to perform one or more of the functions described herein.

In some examples, a bus 1040 may support communications of (e.g., within) a protocol layer of a protocol stack. In some examples, a bus 1040 may support communications associated with a logical channel of a protocol stack (e.g., between protocol layers of a protocol stack), which may include communications performed within a component of the device 1005, or between different components of the device 1005 that may be co-located or located in different locations (e.g., where the device 1005 may refer to a system in which one or more of the communications manager 1020, the transceiver 1010, the at least one memory 1025, the code 1030, and the at least one processor 1035 may be located in one of the different components or divided between different components).

In some examples, the communications manager 1020 may manage aspects of communications with a core network 130 (e.g., via one or more wired or wireless backhaul links).

For example, the communications manager 1020 may manage the transfer of data communications for client devices, such as one or more UEs 115. In some examples, the communications manager 1020 may manage communications with one or more other network entities 105, and may include a controller or scheduler for controlling communications with UEs 115 (e.g., in cooperation with the one or more other network devices). In some examples, the communications manager 1020 may support an X2 interface within an LTE/LTE-A wireless communications network technology to provide communication between network entities 105.

The communications manager 1020 may support wireless communication in accordance with examples as disclosed herein. For example, the communications manager 1020 is capable of, configured to, or operable to support a means for obtaining a transmit signal. The communications manager 1020 is capable of, configured to, or operable to support a means for detecting one or more peaks associated with a power level of the transmit signal. The communications manager 1020 is capable of, configured to, or operable to support a means for selecting, from one or more memories associated with the wireless communication device, one or more cancellation signals based on the one or more peaks associated with the power level of the transmit signal. The communications manager 1020 is capable of, configured to, or operable to support a means for performing a wireless transmission in association with applying the one or more cancellation signals to the transmit signal.

Additionally, or alternatively, the communications manager 1020 may support wireless communication in accordance with examples as disclosed herein. For example, the communications manager 1020 is capable of, configured to, or operable to support a means for receiving information indicative of one or more transmission configurations of the wireless communication device, where the one or more transmission configurations are based on one or more component carrier configurations or one or more resource block configurations, or both. The communications manager 1020 is capable of, configured to, or operable to support a means for generating a set of multiple cancellation signals based on the one or more transmission configurations of the wireless communication device. The communications manager 1020 is capable of, configured to, or operable to support a means for storing the set of multiple cancellation signals in one or more memories associated with the wireless communication device.

By including or configuring the communications manager 1020 in accordance with examples as described herein, the device 1005 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1020 may be configured to perform various operations (e.g., receiving, obtaining, monitoring, outputting, transmitting) using or otherwise in cooperation with the transceiver 1010, the one or more antennas 1015 (e.g., where applicable), or any combination thereof. Although the communications manager 1020 is illustrated as a separate component, in some examples, one or more functions described with reference to the communications manager 1020 may be supported by or performed by the transceiver 1010, one or more of the at least one processor 1035, one or more of the at least one memory 1025, the code 1030, or any combination thereof (for example, by a processing system including at least a portion of the at least one processor 1035, the at least one memory 1025, the code 1030, or any combination thereof). For example, the code 1030 may include instructions executable by one or more of the at least one processor 1035 to cause the device 1005 to perform various aspects of efficient spectral-shaping CFR as described herein, or the at least one processor 1035 and the at least one memory 1025 may be otherwise configured to, individually or collectively, perform or support such operations.

Figure 11:
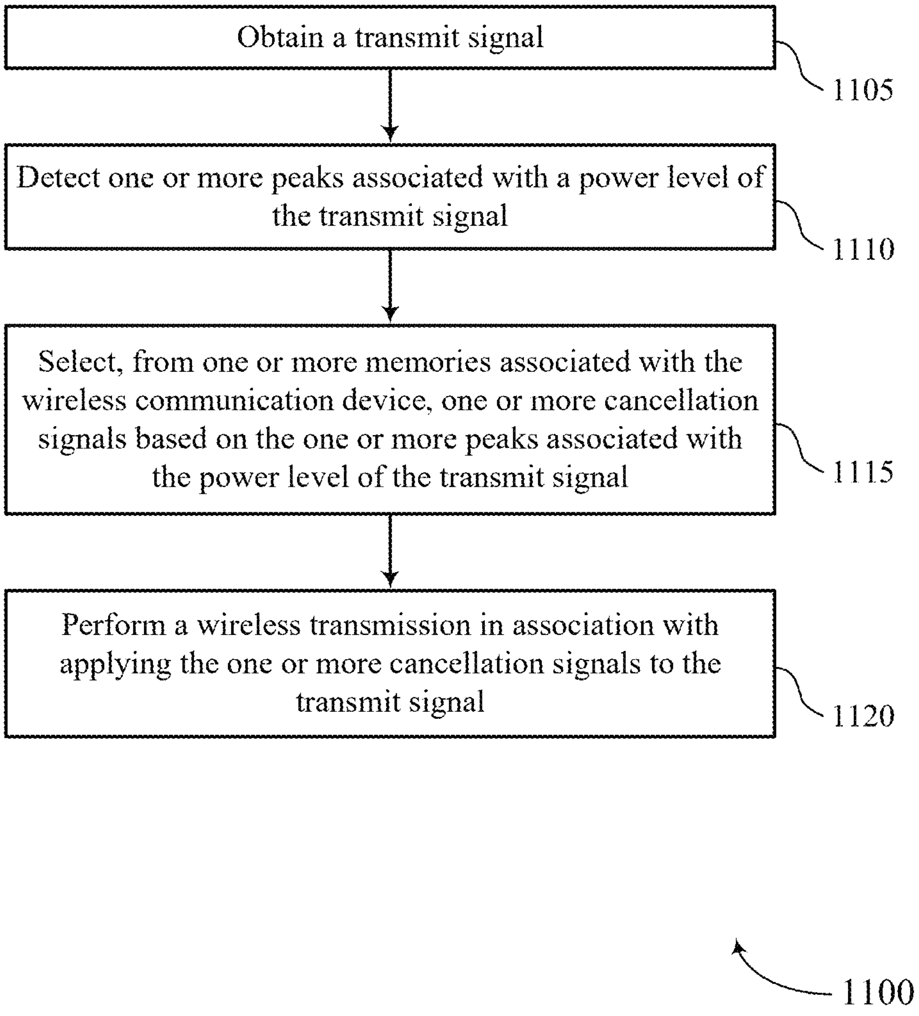
FIGS. 11 through 14 show flowcharts illustrating methods that support efficient spectral-shaping CFR in accordance with one or more aspects of the present disclosure.

FIG. 11 shows a flowchart illustrating a method 1100 that supports efficient spectral-shaping CFR in accordance with one or more aspects of the present disclosure. The operations of the method 1100 may be implemented by a wireless communication device (e.g., a UE or a network entity) or its components as described herein. For example, the operations of the method 1100 may be performed by a UE 115, a network entity 105, or a wireless communication device 205-*a* as described with reference to FIGS. 1 through 10. In some examples, a wireless communication device may execute a set of instructions to control the functional elements of the wireless communication device to perform the described functions. Additionally, or alternatively, the wireless communication device may perform aspects of the described functions using special-purpose hardware.

At 1105, the method may include obtaining a transmit signal. The operations of 1105 may be performed in accordance with examples as disclosed herein. In some examples, aspects of the operations of 1105 may be performed by a signaling component 825 as described with reference to FIG. 8.

At 1110, the method may include detecting one or more peaks associated with a power level of the transmit signal. The operations of 1110 may be performed in accordance with examples as disclosed herein. In some examples, aspects of the operations of 1110 may be performed by a peak detector 830 as described with reference to FIG. 8.

At 1115, the method may include selecting, from one or more memories associated with the wireless communication device, one or more cancellation signals based on the one or more peaks associated with the power level of the transmit signal. The operations of 1115 may be performed in accordance with examples as disclosed herein. In some examples, aspects of the operations of 1115 may be performed by a cancelling component 835 as described with reference to FIG. 8.

At 1120, the method may include performing a wireless transmission in association with applying the one or more cancellation signals to the transmit signal. The operations of 1120 may be performed in accordance with examples as disclosed herein. In some examples, aspects of the operations of 1120 may be performed by a signaling component 825 as described with reference to FIG. 8.

Figure 12:
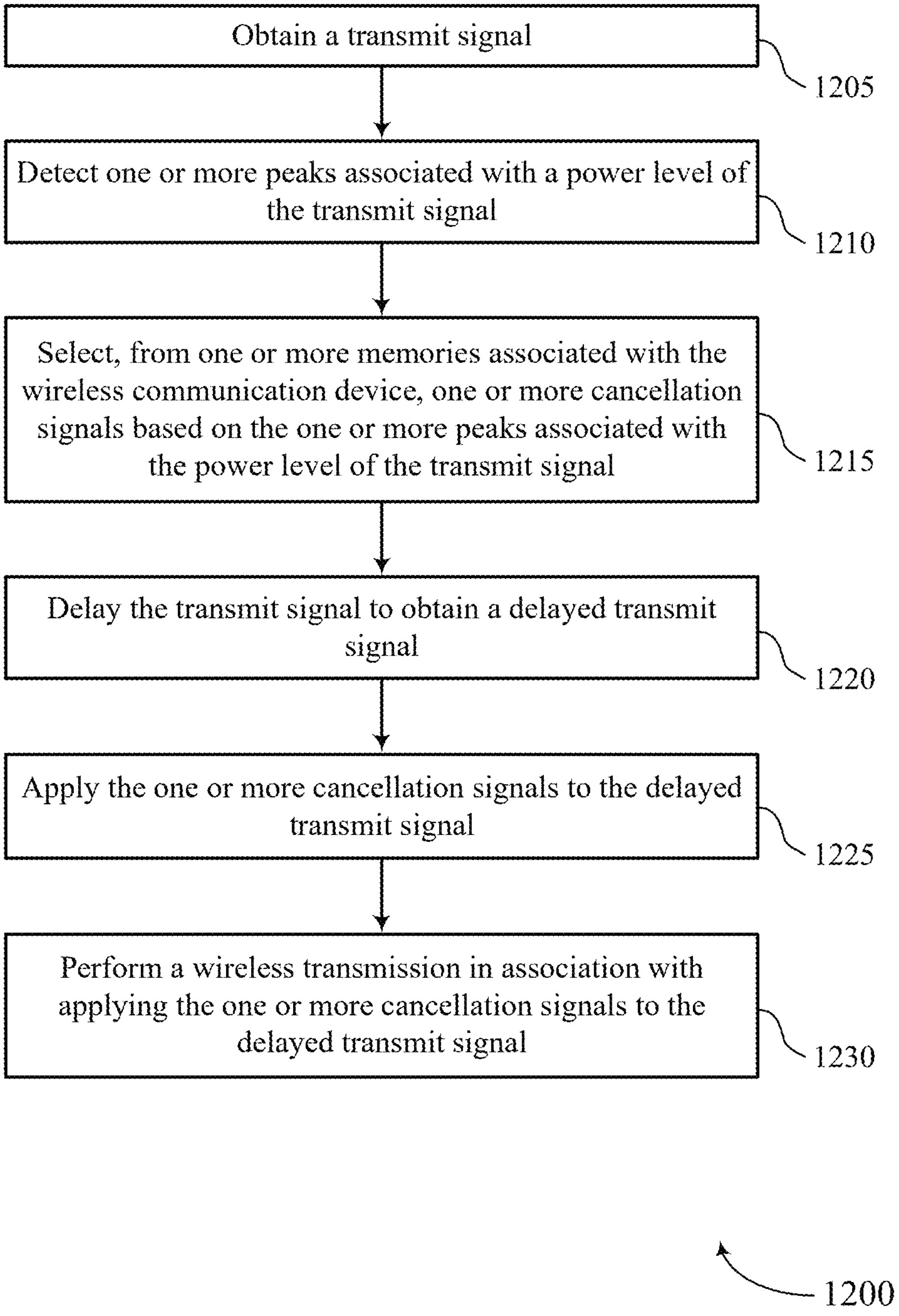

FIG. 12 shows a flowchart illustrating a method 1200 that supports efficient spectral-shaping CFR in accordance with one or more aspects of the present disclosure. The operations of the method 1200 may be implemented by a wireless communication device (e.g., a UE or a network entity) or its components as described herein. For example, the operations of the method 1200 may be performed by a UE 115, a network entity 105, or a wireless communication device 205-*a* as described with reference to FIGS. 1 through 10. In some examples, a wireless communication device may execute a set of instructions to control the functional elements of the wireless communication device to perform the described functions. Additionally, or alternatively, the wireless communication device may perform aspects of the described functions using special-purpose hardware.

At 1205, the method may include obtaining a transmit signal. The operations of 1205 may be performed in accordance with examples as disclosed herein. In some examples, aspects of the operations of 1205 may be performed by a signaling component 825 as described with reference to FIG. 8.

At 1210, the method may include detecting one or more peaks associated with a power level of the transmit signal. The operations of 1210 may be performed in accordance with examples as disclosed herein. In some examples, aspects of the operations of 1210 may be performed by a peak detector 830 as described with reference to FIG. 8.

At 1215, the method may include selecting, from one or more memories associated with the wireless communication device, one or more cancellation signals based on the one or more peaks associated with the power level of the transmit signal. The operations of 1215 may be performed in accordance with examples as disclosed herein. In some examples, aspects of the operations of 1215 may be performed by a cancelling component 835 as described with reference to FIG. 8.

At 1220, the method may include delaying the transmit signal to obtain a delayed transmit signal. The operations of 1220 may be performed in accordance with examples as disclosed herein. In some examples, aspects of the operations of 1220 may be performed by a delay line component 855 as described with reference to FIG. 8.

At 1225, the method may include applying the one or more cancellation signals to the delayed transmit signal. The operations of 1225 may be performed in accordance with examples as disclosed herein. In some examples, aspects of the operations of 1225 may be performed by a cancelling component 835 as described with reference to FIG. 8.

At 1230, the method may include performing a wireless transmission in association with applying the one or more cancellation signals to the delayed transmit signal. The operations of 1230 may be performed in accordance with examples as disclosed herein. In some examples, aspects of the operations of 1230 may be performed by a signaling component 825 as described with reference to FIG. 8.

Figure 13:
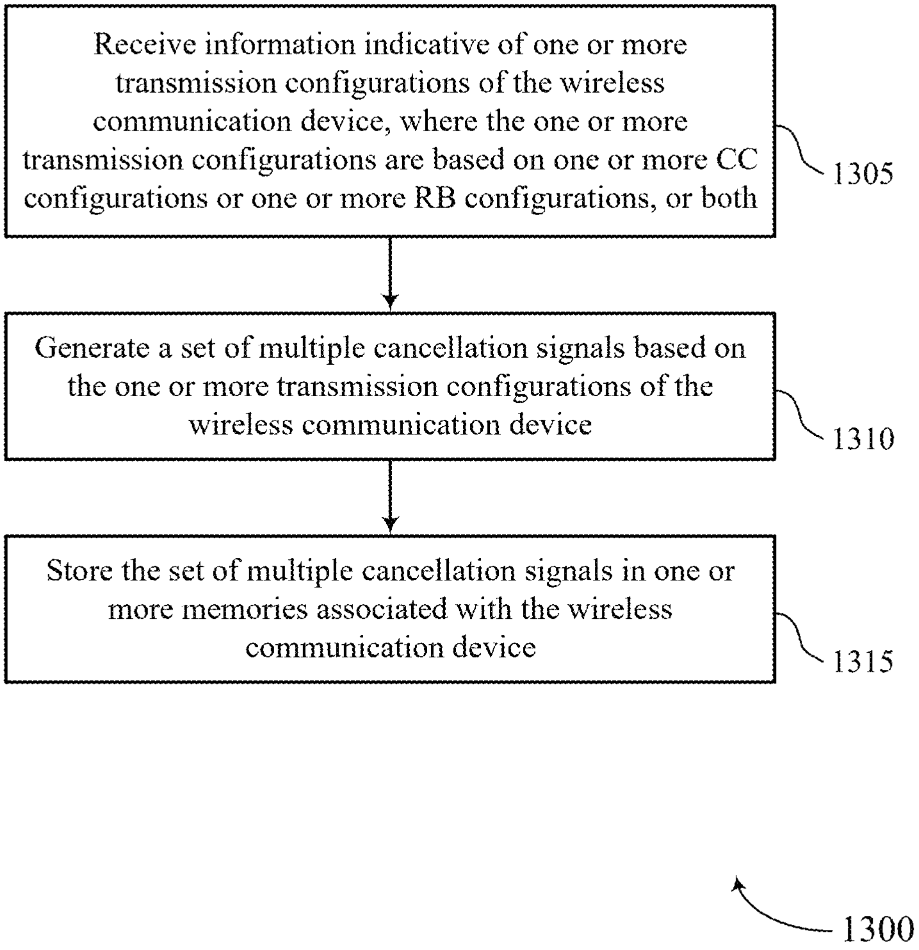

FIG. 13 shows a flowchart illustrating a method 1300 that supports efficient spectral-shaping CFR in accordance with one or more aspects of the present disclosure. The operations of the method 1300 may be implemented by a wireless communication device (e.g., a UE or a network entity) or its components as described herein. For example, the operations of the method 1300 may be performed by a UE 115, a network entity 105, or a wireless communication device 205-*a* as described with reference to FIGS. 1 through 10. In some examples, a wireless communication device may execute a set of instructions to control the functional elements of the wireless communication device to perform the described functions. Additionally, or alternatively, the wireless communication device may perform aspects of the described functions using special-purpose hardware.

At 1305, the method may include receiving information indicative of one or more transmission configurations of the wireless communication device, where the one or more transmission configurations are based on one or more CC configurations or one or more RB configurations, or both. The operations of 1305 may be performed in accordance with examples as disclosed herein. In some examples, aspects of the operations of 1305 may be performed by a transmission configuration component 840 as described with reference to FIG. 8.

At 1310, the method may include generating a set of multiple cancellation signals based on the one or more transmission configurations of the wireless communication device. The operations of 1310 may be performed in accordance with examples as disclosed herein. In some examples, aspects of the operations of 1310 may be performed by a cancellation signal generation component 845 as described with reference to FIG. 8.

At 1315, the method may include storing the set of multiple cancellation signals in one or more memories associated with the wireless communication device. The operations of 1315 may be performed in accordance with examples as disclosed herein. In some examples, aspects of the operations of 1315 may be performed by a memory component 850 as described with reference to FIG. 8.

Figure 14:
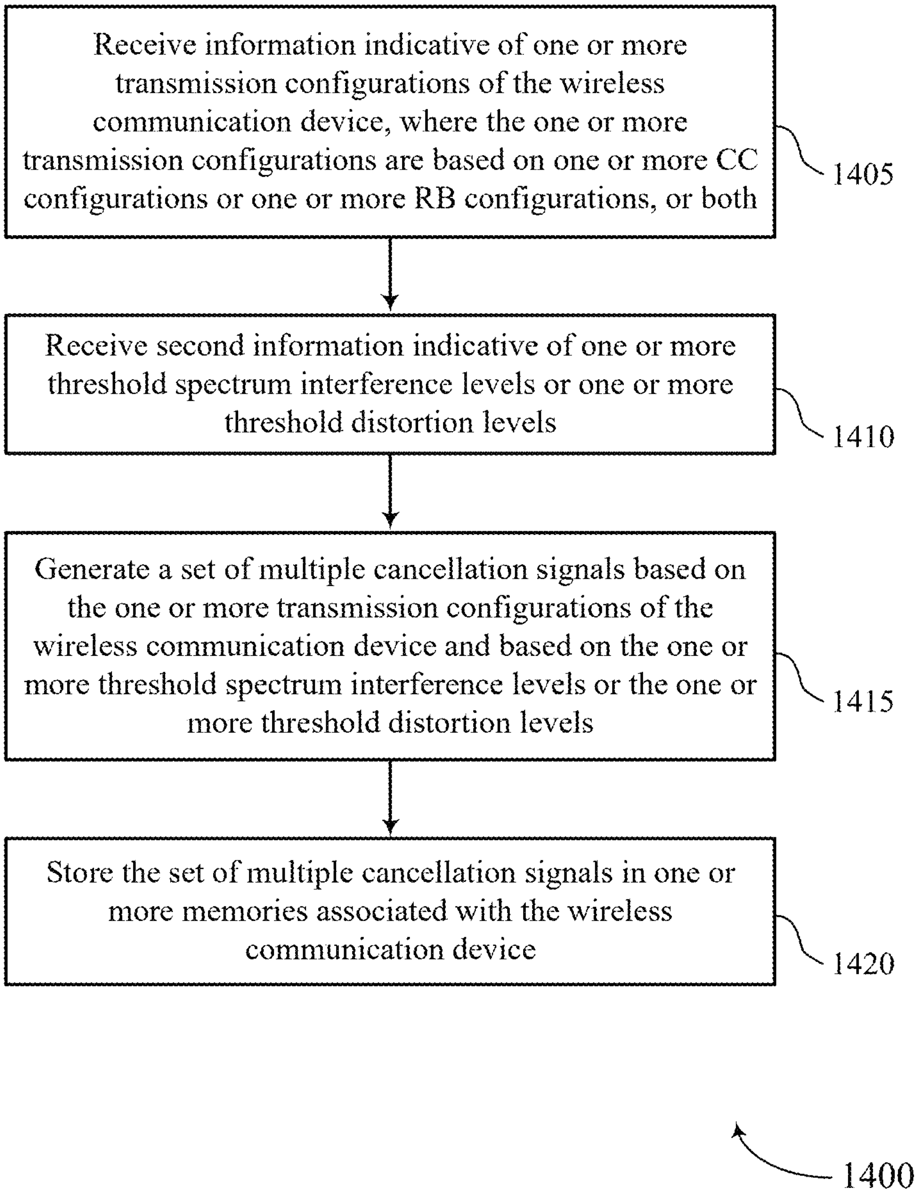

FIG. 14 shows a flowchart illustrating a method 1400 that supports efficient spectral-shaping CFR in accordance with one or more aspects of the present disclosure. The operations of the method 1400 may be implemented by a wireless communication device (e.g., a UE or a network entity) or its components as described herein. For example, the operations of the method 1400 may be performed by a UE 115, a network entity 105, or a wireless communication device 205-*a* as described with reference to FIGS. 1 through 10. In some examples, a wireless communication device may execute a set of instructions to control the functional elements of the wireless communication device to perform the described functions. Additionally, or alternatively, the wireless communication device may perform aspects of the described functions using special-purpose hardware.

At 1405, the method may include receiving information indicative of one or more transmission configurations of the wireless communication device, where the one or more transmission configurations are based on one or more component carrier configurations or one or more resource block configurations, or both. The operations of 1405 may be performed in accordance with examples as disclosed herein. In some examples, aspects of the operations of 1405 may be performed by a transmission configuration component 840 as described with reference to FIG. 8.

At 1410, the method may include receiving second information indicative of one or more threshold spectrum interference levels or one or more threshold distortion levels. The operations of 1410 may be performed in accordance with examples as disclosed herein. In some examples, aspects of the operations of 1410 may be performed by a cancellation signal generation component 845 as described with reference to FIG. 8.

At 1415, the method may include generating a set of multiple cancellation signals based on the one or more transmission configurations of the wireless communication device and based on the one or more threshold spectrum interference levels or the one or more threshold distortion levels. The operations of 1415 may be performed in accordance with examples as disclosed herein. In some examples, aspects of the operations of 1415 may be performed by a cancellation signal generation component 845 as described with reference to FIG. 8.

At 1420, the method may include storing the set of multiple cancellation signals in one or more memories associated with the wireless communication device. The operations of 1420 may be performed in accordance with examples as disclosed herein. In some examples, aspects of the operations of 1420 may be performed by a memory component 850 as described with reference to FIG. 8.

The following provides an overview of aspects of the present disclosure:

Aspect 1: A method for wireless communication at a wireless communication device, comprising: obtaining a transmit signal; detecting one or more peaks associated with a power level of the transmit signal; selecting, from one or more memories associated with the wireless communication device, one or more cancellation signals based at least in part on the one or more peaks associated with the power level of the transmit signal; and performing a wireless transmission in association with applying the one or more cancellation signals to the transmit signal.

Aspect 2: The method of aspect 1, further comprising: delaying the transmit signal to obtain a delayed transmit signal; and applying the one or more cancellation signals to the delayed transmit signal, wherein performing the wireless transmission is in association with applying the one or more cancellation signals to the delayed transmit signal.

Aspect 3: The method of aspect 2, further comprising: truncating the delayed transmit signal to obtain a portion of the delayed transmit signal, wherein applying the one or more cancellation signals to the delayed transmit signal comprises applying the one or more cancellation signals to the portion of the delayed transmit signal.

Aspect 4: The method of any of aspects 1-3, further comprising: scaling the one or more cancellation signals based at least in part on one or more magnitudes of the one or more peaks to obtain a scaled one or more cancellation signals; and applying the scaled one or more cancellation signals to the transmit signal, wherein performing the wireless transmission is in association with applying the scaled one or more cancellation signals to the transmit signal.

Aspect 5: The method of any of aspects 1-4, further comprising: rotating the one or more cancellation signals based at least in part on one or more angles of the one or more peaks to obtain a rotated one or more cancellation signals; and applying the rotated one or more cancellation signals to the transmit signal, wherein performing the wireless transmission is in association with applying the rotated one or more cancellation signals to the transmit signal.

Aspect 6: The method of any of aspects 1-5, further comprising: obtaining a second transmit signal in association with applying the one or more cancellation signals to the transmit signal; and applying a clipper to the second transmit signal, wherein a magnitude of the clipper is based at least in part on the one or more cancellation signals, and wherein performing the wireless transmission is in association with applying the clipper to the second transmit signal.

Aspect 7: The method of any of aspects 1-6, wherein the transmit signal is a wideband transmit signal associated with a plurality of narrowband transmit signals; and the one or more cancellation signals are associated with a plurality of narrowband cancellation signals that correspond to the plurality of narrowband transmit signals, each narrowband cancellation signal of the plurality of narrowband cancellation signals corresponding to a respective narrowband transmit signal of the plurality of narrowband transmit signals.

Aspect 8: The method of aspect 7, further comprising: combining the plurality of narrowband cancellation signals to obtain a wideband cancellation signal; and applying the wideband cancellation signal to the wideband transmit signal, wherein performing the wireless transmission is in association with applying the wideband cancellation signal to the wideband transmit signal.

Aspect 9: The method of aspect 8, wherein the wideband cancellation signal is based at least in part on a modulated summation of the plurality of narrowband cancellation signals.

Aspect 10: The method of any of aspects 8-9, wherein combining the plurality of narrowband cancellation signals to obtain the wideband cancellation signal comprises: applying a respective weight to each narrowband cancellation signal of the plurality of narrowband cancellation signals to obtain a weighted plurality of narrowband cancellation signals; and combining the weighted plurality of narrowband cancellation signals to obtain the wideband cancellation signal.

Aspect 11: The method of aspect 10, wherein the plurality of narrowband transmit signals is associated with a variation in power density levels between different narrowband transmit signals of the plurality of narrowband transmit signals; the respective weight applied to each narrowband cancellation signal of the plurality of narrowband cancellation signals is based at least in part on a deviation of gains between the plurality of narrowband transmit signals to obtain an equal power density level across the wideband transmit signal; and the deviation of gains between the plurality of narrowband transmit signals is based at least in part on the variation in power density levels between the different narrowband transmit signals of the plurality of narrowband transmit signals.

Aspect 12: The method of any of aspects 8-11, further comprising: normalizing the wideband cancellation signal to obtain a normalized wideband cancellation signal; and storing the normalized wideband cancellation signal in the one or more memories associated with the wireless communication device, wherein selecting the one or more cancellation signals comprises selecting the normalized wideband cancellation signal, and wherein applying the wideband cancellation signal to the wideband transmit signal comprises applying the normalized wideband cancellation signal to the wideband transmit signal.

Aspect 13: The method of any of aspects 7-12, further comprising: applying each narrowband cancellation signal of the plurality of narrowband cancellation signals corresponding to the respective narrowband transmit signal of the plurality of narrowband transmit signals, wherein performing the wireless transmission is in association with applying each narrowband cancellation signal to the respective narrowband transmit signal.

Aspect 14: The method of any of aspects 1-13, wherein the one or more cancellation signals are further selected based at least in part on a transmission configuration of the wireless communication device, one or more threshold spectrum interference levels, one or more threshold distortion levels, or any combination thereof; and the transmission configuration is based at least in part on a CC configuration associated with the transmit signal or an RB configuration associated with the transmit signal, or both.

Aspect 15: The method of aspect 14, wherein in accordance with selecting the one or more cancellation signals based at least in part on the RB configuration associated with the transmit signal, the one or more cancellation signals are based at least in part on one or more modulation schemes associated with the transmit signal, one or more coding rates associated with the transmit signal, or a set of RBs within a CC associated with the transmit signal.

Aspect 16: The method of any of aspects 14-15, wherein in accordance with selecting the one or more cancellation signals based at least in part on the CC configuration associated with the transmit signal, the one or more cancellation signals are based at least in part on one or more gaps between two or more CCs associated with the transmit signal or one or more power density levels of one or more CCs associated with the transmit signal.

Aspect 17: A method for wireless communication at a wireless communication device, comprising: receiving information indicative of one or more transmission configurations of the wireless communication device, wherein the one or more transmission configurations are based at least in part on one or more CC configurations or one or more RB configurations, or both; generating a plurality of cancellation signals based at least in part on the one or more transmission configurations of the wireless communication device; and storing the plurality of cancellation signals in one or more memories associated with the wireless communication device.

Aspect 18: The method of aspect 17, further comprising: receiving second information indicative of one or more threshold spectrum interference levels or one or more threshold distortion levels, wherein generating the plurality of cancellation signals is further based at least in part on the one or more threshold spectrum interference levels or the one or more threshold distortion levels.

Aspect 19: The method of any of aspects 17-18, wherein the plurality of cancellation signals comprises a set of wideband cancellation signals.

Aspect 20: The method of aspect 19, wherein generating the set of wideband cancellation signals comprises: generating a plurality of narrowband cancellation signals based at least in part on the one or more transmission configurations of the wireless communication device and based at least in part on one or more threshold spectrum interference levels or one or more threshold distortion levels; and combining the plurality of narrowband cancellation signals to obtain the set of wideband cancellation signals.

Aspect 21: The method of aspect 20, wherein combining the plurality of narrowband cancellation signals to obtain the set of wideband cancellation signals comprises: combining a first plurality of narrowband cancellation signals to obtain a first wideband cancellation signal; and combining a second plurality of narrowband cancellation signals to obtain a second wideband cancellation signal.

Aspect 22: The method of aspect 21, wherein the first wideband cancellation signal is based at least in part on a first modulated summation of the first plurality of narrowband cancellation signals and is associated with a first transmission configuration of the one or more transmission configurations; and the second wideband cancellation signal is based at least in part on a second modulated summation of the second plurality of narrowband cancellation signals and is associated with a second transmission configuration of the one or more transmission configurations.

Aspect 23: The method of any of aspects 21-22, further comprising: applying a first respective weight to each narrowband cancellation signal of the first plurality of narrowband cancellation signals to obtain a weighted first plurality of narrowband cancellation signals, wherein obtaining the first wideband cancellation signal is based at least in part on combining the weighted first plurality of narrowband cancellation signals; and applying a second respective weight to each narrowband cancellation signal of the second plurality of narrowband cancellation signals to obtain a weighted second plurality of narrowband cancellation signals, wherein obtaining the second wideband cancellation signal is based at least in part on combining the weighted second plurality of narrowband cancellation signals.

Aspect 24: The method of aspect 23, wherein the first respective weight applied to each narrowband cancellation signal of the first plurality of narrowband cancellation signals is based at least in part on a first variation in power density levels between different narrowband transmit signals associated with a first transmit signal; and the second respective weight applied to each narrowband cancellation signal of the second plurality of narrowband cancellation signals is based at least in part on a second variation in power density levels between different narrowband transmit signals associated with a second transmit signal.

Aspect 25: The method of any of aspects 21-24, further comprising: normalizing the first wideband cancellation signal to obtain a normalized first wideband cancellation signal, wherein storing the plurality of cancellation signals comprises storing the normalized first wideband cancellation signal; and normalizing the second wideband cancellation signal to obtain a normalized second wideband cancellation signal, wherein storing the plurality of cancellation signals comprises storing the normalized second wideband cancellation signal.

Aspect 26: The method of any of aspects 20-25, wherein each wideband cancellation signal of the set of wideband cancellation signals is based at least in part on a respective transmission configuration of the one or more transmission configurations of the wireless communication device.

Aspect 27: The method of any of aspects 17-26, wherein the plurality of cancellation signals comprises a set of narrowband cancellation signals.

Aspect 28: The method of aspect 27, wherein each narrowband cancellation signal of the set of narrowband cancellation signals corresponds to a respective CC of a set of CCs, the set of CCs based at least in part on the one or more CC configurations.

Aspect 29: The method of any of aspects 17-28, wherein generating the plurality of cancellation signals comprises: generating the plurality of cancellation signals based at least in part on one or more modulation schemes, one or more coding rates, or a set of RBs within a CC in accordance with the one or more RB configurations.

Aspect 30: The method of any of aspects 17-29, wherein generating the plurality of cancellation signals comprises: generating the plurality of cancellation signals based at least in part on one or more gaps between two or more CCs or one or more power density levels of one or more CCs in accordance with the one or more CC configurations.

Aspect 31: The method of any of aspects 17-30, further comprising: updating, based at least in part on one or more configured parameters or based at least in part on feedback associated with one or more wireless transmissions by the wireless communication device, one or more cancellation signals of the plurality of cancellation signals to obtain an updated one or more cancellation signals; and storing the updated one or more cancellation signals in the one or more memories associated with the wireless communication device.

Aspect 32: The method of any of aspects 17-31, further comprising: performing one or more wireless transmissions in association with applying one or more cancellation signals, from the plurality of cancellation signals stored in the one or more memories, to one or more transmit signals, wherein a selection of the one or more cancellation signals, from the plurality of cancellation signals stored in the one or more memories, is based at least in part on one or more peaks associated with a power level of the one or more transmit signals.

Aspect 33: A wireless communication device for wireless communication, comprising one or more memories storing processor-executable code, and one or more processors coupled with the one or more memories and individually or collectively operable to execute the code to cause the wireless communication device to perform a method of any of aspects 1-16.

Aspect 34: A wireless communication device for wireless communication, comprising at least one means for performing a method of any of aspects 1-16.

Aspect 35: A non-transitory computer-readable medium storing code for wireless communication, the code comprising instructions executable by one or more processors to perform a method of any of aspects 1-16.

Aspect 36: A wireless communication device for wireless communication, comprising one or more memories storing processor-executable code, and one or more processors coupled with the one or more memories and individually or collectively operable to execute the code to cause the wireless communication device to perform a method of any of aspects 17-32.

Aspect 37: A wireless communication device for wireless communication, comprising at least one means for performing a method of any of aspects 17-32.

Aspect 38: A non-transitory computer-readable medium storing code for wireless communication, the code comprising instructions executable by one or more processors to perform a method of any of aspects 17-32.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a GPU, an NPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term “a component” having characteristics or performing functions may refer to “at least one of one or more components” having a particular characteristic or performing a particular function. Subsequent reference to a component introduced with the article “a” using the terms “the” or “said” may refer to any or all of the one or more components. For example, a component introduced with the article “a” may be understood to mean “one or more components,” and referring to “the component” subsequently in the claims may be understood to be equivalent to referring to “at least one of the one or more components.” Similarly, subsequent reference to a component introduced as “one or more components” using the terms “the” or “said” may refer to any or all of the one or more components. For example, referring to “the one or more components” subsequently in the claims may be understood to be equivalent to referring to “at least one of the one or more components.”

The term “determine” or “determining” encompasses a variety of actions and, therefore, “determining” can include calculating, computing, processing, deriving, investigating, looking up (such as via looking up in a table, a database, or another data structure), ascertaining, and the like. Also, “determining” can include receiving (e.g., receiving information), accessing (e.g., accessing data stored in memory), and the like. Also, “determining” can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term “example” used herein means “serving as an example, instance, or illustration” and not “preferred” or “advantageous over other examples.” The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A wireless communication device, comprising:

one or more first memories storing processor-executable code; and one or more processors coupled with the one or more first memories and individually or collectively operable to execute the code to cause the wireless communication device to:

receive information indicative of one or more transmission configurations of the wireless communication device, wherein the one or more transmission configurations are based at least in part on one or more component carrier configurations or one or more resource block configurations, or both;

generate a plurality of cancellation signals based at least in part on the one or more transmission configurations of the wireless communication device; and store the plurality of cancellation signals in one or more second memories associated with the wireless communication device.

2. The wireless communication device of claim 1, wherein the one or more processors are individually or collectively further operable to execute the code to cause the wireless communication device to:

receive second information indicative of one or more threshold spectrum interference levels or one or more threshold distortion levels, wherein generating the plurality of cancellation signals is further based at least in part on the one or more threshold spectrum interference levels or the one or more threshold distortion levels.

3. The wireless communication device of claim 1, wherein:

the plurality of cancellation signals comprises a set of wideband cancellation signals; and to generate the set of wideband cancellation signals, the one or more processors are individually or collectively operable to execute the code to cause the wireless communication device to:

generate a plurality of narrowband cancellation signals based at least in part on the one or more transmission configurations of the wireless communication device and based at least in part on one or more threshold spectrum interference levels or one or more threshold distortion levels; and combine the plurality of narrowband cancellation signals to obtain the set of wideband cancellation signals.

4. The wireless communication device of claim 3, wherein, to combine the plurality of narrowband cancellation signals to obtain the set of wideband cancellation signals, the one or more processors are individually or collectively operable to execute the code to cause the wireless communication device to:

combine a first plurality of narrowband cancellation signals to obtain a first wideband cancellation signal; and combine a second plurality of narrowband cancellation signals to obtain a second wideband cancellation signal.

5. The wireless communication device of claim 4, wherein:

the first wideband cancellation signal is based at least in part on a first modulated summation of the first plurality of narrowband cancellation signals and is associated with a first transmission configuration of the one or more transmission configurations; and the second wideband cancellation signal is based at least in part on a second modulated summation of the second plurality of narrowband cancellation signals and is associated with a second transmission configuration of the one or more transmission configurations.

6. The wireless communication device of claim 4, wherein the one or more processors are individually or collectively further operable to execute the code to cause the wireless communication device to:

apply a first respective weight to each narrowband cancellation signal of the first plurality of narrowband cancellation signals to obtain a weighted first plurality of narrowband cancellation signals, wherein obtaining the first wideband cancellation signal is based at least in part on combining the weighted first plurality of narrowband cancellation signals; and apply a second respective weight to each narrowband cancellation signal of the second plurality of narrowband cancellation signals to obtain a weighted second plurality of narrowband cancellation signals, wherein obtaining the second wideband cancellation signal is based at least in part on combining the weighted second plurality of narrowband cancellation signals.

7. The wireless communication device of claim 6, wherein:

the first respective weight applied to each narrowband cancellation signal of the first plurality of narrowband cancellation signals is based at least in part on a first variation in power density levels between different narrowband transmit signals associated with a first transmit signal; and the second respective weight applied to each narrowband cancellation signal of the second plurality of narrowband cancellation signals is based at least in part on a second variation in power density levels between different narrowband transmit signals associated with a second transmit signal.

8. The wireless communication device of claim 4, wherein the one or more processors are individually or collectively further operable to execute the code to cause the wireless communication device to:

normalize the first wideband cancellation signal to obtain a normalized first wideband cancellation signal, wherein storing the plurality of cancellation signals comprises storing the normalized first wideband cancellation signal; and normalize the second wideband cancellation signal to obtain a normalized second wideband cancellation signal, wherein storing the plurality of cancellation signals comprises storing the normalized second wideband cancellation signal.

9. The wireless communication device of claim 3, wherein each wideband cancellation signal of the set of wideband cancellation signals is based at least in part on a respective transmission configuration of the one or more transmission configurations of the wireless communication device.

10. The wireless communication device of claim 1, wherein, to generate the plurality of cancellation signals, the one or more processors are individually or collectively operable to execute the code to cause the wireless communication device to:

generate the plurality of cancellation signals based at least in part on one or more modulation schemes, one or more coding rates, or a set of resource blocks within a component carrier in accordance with the one or more resource block configurations; or generate the plurality of cancellation signals based at least in part on one or more gaps between two or more component carriers or one or more power density levels of one or more component carriers in accordance with the one or more component carrier configurations.

11. The wireless communication device of claim 1, wherein the one or more processors are individually or collectively further operable to execute the code to cause the wireless communication device to:

update, based at least in part on one or more configured parameters or based at least in part on feedback associated with one or more wireless transmissions by the wireless communication device, one or more cancellation signals of the plurality of cancellation signals to obtain an updated one or more cancellation signals; and store the updated one or more cancellation signals in the one or more second memories associated with the wireless communication device.

12. The wireless communication device of claim 1, wherein the plurality of cancellation signals comprises a set of narrowband cancellation signals.

13. The wireless communication device of claim 12, wherein each narrowband cancellation signal of the set of narrowband cancellation signals corresponds to a respective component carrier of a set of component carriers, the set of component carriers based at least in part on the one or more component carrier configurations.

14. A method for wireless communication at a wireless communication device, comprising:

receiving information indicative of one or more transmission configurations of the wireless communication device, wherein the one or more transmission configurations are based at least in part on one or more component carrier configurations or one or more resource block configurations, or both;

generating a plurality of cancellation signals based at least in part on the one or more transmission configurations of the wireless communication device; and storing the plurality of cancellation signals in one or more second memories associated with the wireless communication device.

15. The method of claim 14, further comprising:

receiving second information indicative of one or more threshold spectrum interference levels or one or more threshold distortion levels, wherein generating the plurality of cancellation signals is further based at least in part on the one or more threshold spectrum interference levels or the one or more threshold distortion levels.

16. The method of claim 14, wherein:

the plurality of cancellation signals comprises a set of wideband cancellation signals; and generating the set of wideband cancellation signals comprises:

generating a plurality of narrowband cancellation signals based at least in part on the one or more transmission configurations of the wireless communication device and based at least in part on one or more threshold spectrum interference levels or one or more threshold distortion levels; and combining the plurality of narrowband cancellation signals to obtain the set of wideband cancellation signals.

17. The method of claim 16, wherein combining the plurality of narrowband cancellation signals to obtain the set of wideband cancellation signals comprises:

combining a first plurality of narrowband cancellation signals to obtain a first wideband cancellation signal; and combining a second plurality of narrowband cancellation signals to obtain a second wideband cancellation signal.

18. The method of claim 17, wherein:

the first wideband cancellation signal is based at least in part on a first modulated summation of the first plurality of narrowband cancellation signals and is associated with a first transmission configuration of the one or more transmission configurations; and the second wideband cancellation signal is based at least in part on a second modulated summation of the second plurality of narrowband cancellation signals and is associated with a second transmission configuration of the one or more transmission configurations.

19. The method of claim 17, further comprising:

applying a first respective weight to each narrowband cancellation signal of the first plurality of narrowband cancellation signals to obtain a weighted first plurality of narrowband cancellation signals, wherein obtaining the first wideband cancellation signal is based at least in part on combining the weighted first plurality of narrowband cancellation signals; and applying a second respective weight to each narrowband cancellation signal of the second plurality of narrowband cancellation signals to obtain a weighted second plurality of narrowband cancellation signals, wherein obtaining the second wideband cancellation signal is based at least in part on combining the weighted second plurality of narrowband cancellation signals.

20. A non-transitory computer-readable medium storing code for wireless communication, the code comprising instructions executable by one or more processors to:

receive information indicative of one or more transmission configurations of a wireless communication device, wherein the one or more transmission configurations are based at least in part on one or more component carrier configurations or one or more resource block configurations, or both;

generate a plurality of cancellation signals based at least in part on the one or more transmission configurations of the wireless communication device; and store the plurality of cancellation signals in one or more second memories associated with the wireless communication device.

* * * * *